(12) United States Patent
Mangaly et al.

(10) Patent No.: US 12,737,127 B2
(45) **Date of Patent: *Sep. 15, 2026**

(54) CLOUD BASED INTERFACE FOR PROTECTING AND MANAGING DATA STORED IN NETWORKED STORAGE SYSTEMS

(71) Applicant: NETAPP, INC., San Jose, CA (US)

(72) Inventors: Anu O. Mangaly, Bangalore (IN); Deen Dayal Pareta, Bangalore (IN); Sumeet Kumar Sethy, Bangalore (IN); Khaja Hussain Surajuddin, Coimbatore (IN)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/015,297

(22) Filed: Jan. 9, 2025

(65) Prior Publication Data

US 2025/0348231 A1 Nov. 13, 2025

Related U.S. Application Data

(63) Continuation of application No. 18/207,466, filed on Jun. 8, 2023, now Pat. No. 12,204,766, which is a (Continued)

(51) Int. Cl.
*G06F 15/173* (2006.01)
*G06F 3/06* (2006.01)
(Continued)

(52) U.S. Cl.
CPC .......... *G06F 3/0619* (2013.01); *G06F 3/0605* (2013.01); *G06F 3/0622* (2013.01); (Continued)

(58) Field of Classification Search
CPC ... G06F 11/1464; H04L 67/1097; H04L 67/51
See application file for complete search history.

(56) References Cited

U.S. PATENT DOCUMENTS 9,740,568 B2 8/2017 Karinta et al.
9,804,929 B2 10/2017 Karinta et al.
(Continued)

OTHER PUBLICATIONS

NETAPP., “SnapCenter® Software 4.2 Release Notes,” Aug. 2019, 41 pages.

(Continued)

*Primary Examiner* — Padma Mundur
(74) *Attorney, Agent, or Firm* — Jaffery Watson Hamilton & DeSanctis LLP

(57) ABSTRACT

Methods and systems for managing storage is provided. One method includes initializing, a storage service user interface (“SSUI”) within a cloud manager user interface (“CMUI”), the SSUI enables a storage service operation selected from a backup operation, a restore operation and a cloning operation associated with a storage object stored at a cloud volume presented by a cloud layer, the CMUI presented by a cloud provider; transmitting, by the SSUI, an authorization token to a Software As a Service (“SaaS”) layer for authenticating deployment of the SSUI; upon validating the authorization token, initializing a SSUI agent to interface with a deployed storage micro-service layer offered by the cloud layer to execute the storage service operation; transmitting, by the SSUI, an application programming interface (API) request for the SSUI agent for executing the storage service operation; and executing, by the deployed storage micro-service layer, the storage service operation.

17 Claims, 19 Drawing Sheets

Related U.S. Application Data continuation of application No. 17/242,816, filed on Apr. 28, 2021, now Pat. No. 11,726,664.

(51) Int. Cl.

| | |
|---|---|
| ***G06F 9/54*** | (2006.01) |
| ***G06F 11/1446*** | (2026.01) |
| ***G06F 21/44*** | (2013.01) |
| ***H04L 67/1097*** | (2022.01) |
| ***H04L 67/51*** | (2022.01) |

(52) U.S. Cl.

CPC ............ *G06F 3/0659* (2013.01); *G06F 3/067* (2013.01); *G06F 9/547* (2013.01); *G06F 11/1464* (2013.01); *G06F 11/1469* (2013.01); *G06F 21/44* (2013.01); *H04L 67/1097* (2013.01); *H04L 67/51* (2022.05)

(56) References Cited

U.S. PATENT DOCUMENTS

| | | | |
|---|---|---|---|
| 10,387,263 B2 | 8/2019 | Karinta et al. | |
| 10,496,488 B2 | 12/2019 | Karinta et al. | |
| 11,726,664 B2 | 8/2023 | Mangaly et al. | |
| 2016/0188417 A1* | 6/2016 | Karinta | H04L 67/1001 707/654 |
| 2020/0379781 A1* | 12/2020 | Rachapudi | G06F 8/30 |
| 2022/0350496 A1 | 11/2022 | Mangaly et al. | |
| 2023/0325095 A1 | 10/2023 | Mangaly et al. | |

OTHER PUBLICATIONS

NETAPP., “SnapCenter® Software 4.3.1 Release Notes,” Mar. 2020, 41 pages.

Non-Final Office Action mailed on Jun. 4, 2024 for U.S. Appl. No. 18/207,466, filed Jun. 8, 2023, 07 pages.

Notice of Allowance mailed on Sep. 11, 2024 for U.S. Appl. No. 18/207,466, filed Jun. 8, 2023, 07 pages.

* cited by examiner

Figure 1D:
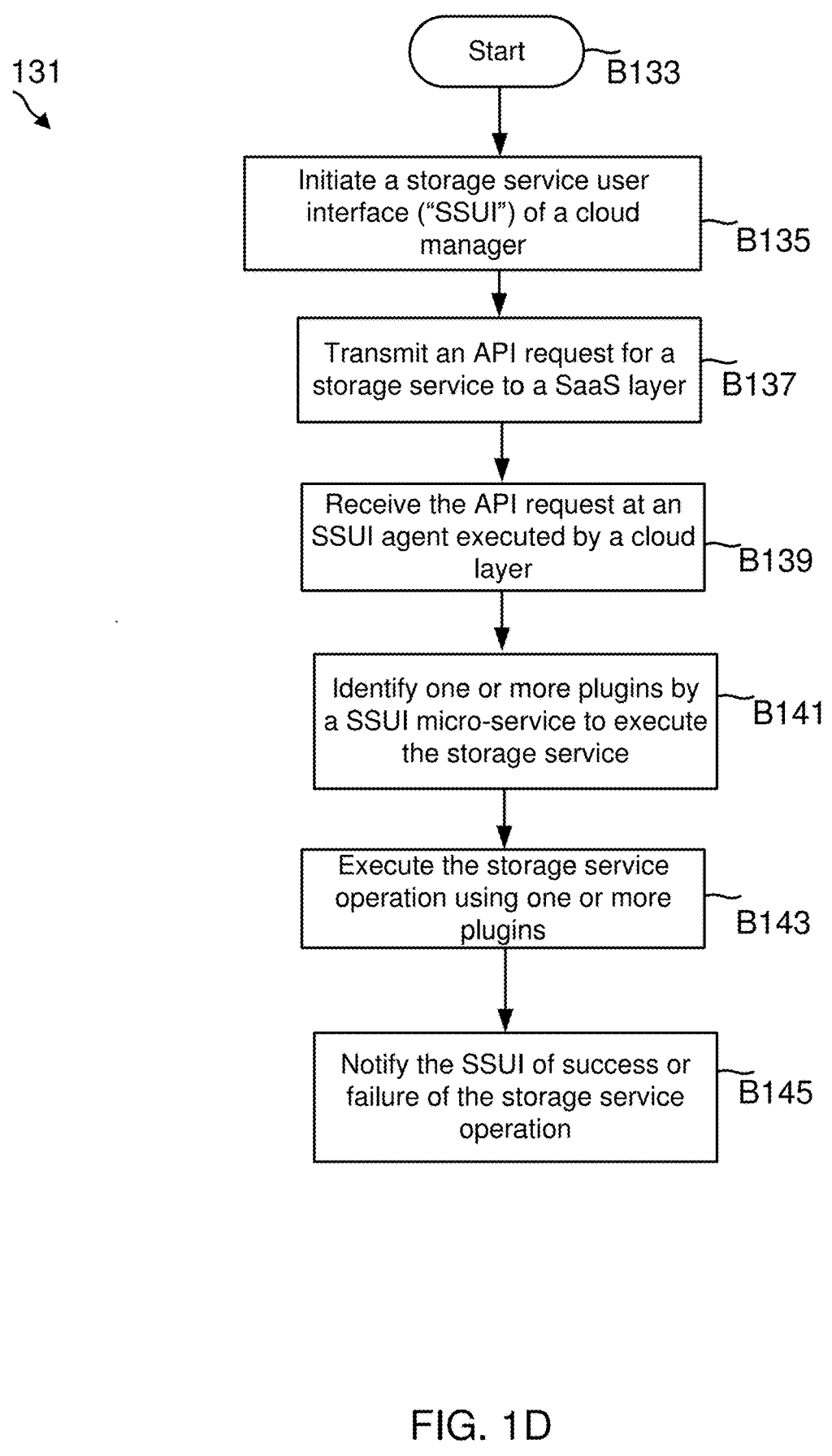

131

Start B133

Initiate a storage service user interface ("SSUI") of a cloud manager B135

Transmit an API request for a storage service to a SaaS layer B137

Receive the API request at an SSUI agent executed by a cloud layer B139

Identify one or more plugins by a SSUI micro-service to execute the storage service B141

Execute the storage service operation using one or more plugins B143

Notify the SSUI of success or failure of the storage service operation B145

Figure 1G:
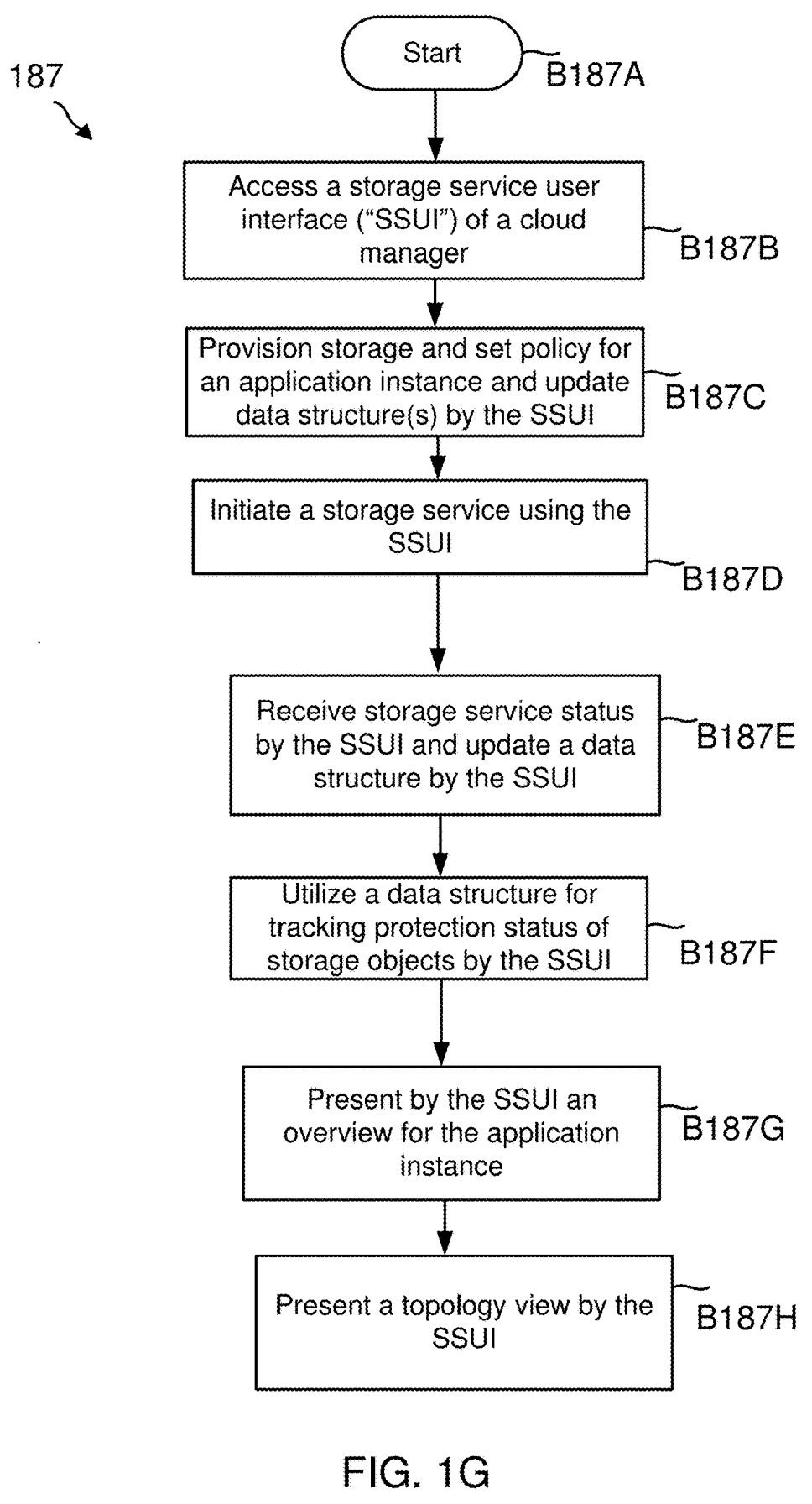

Start — B187A

Access a storage service user interface ("SSUI") of a cloud manager — B187B

Provision storage and set policy for an application instance and update data structure(s) by the SSUI — B187C Initiate a storage service using the SSUI — B187D Receive storage service status by the SSUI and update a data structure by the SSUI — B187E Utilize a data structure for tracking protection status of storage objects by the SSUI — B187F Present by the SSUI an overview for the application instance — B187G Present a topology view by the SSUI — B187H

CLOUD BASED INTERFACE FOR PROTECTING AND MANAGING DATA STORED IN NETWORKED STORAGE SYSTEMS

CROSS-REFERENCE TO RELATED APPLICATIONS

This patent application claims priority of and is a continuation of U.S. patent application Ser. No. 18/207,466, filed on Jun. 8, 2023, issued as U.S. Pat. No. 12,204,766, which is a continuation of U.S. patent application Ser. No. 17/242,816, filed on Apr. 28, 2021, issued as U.S. Pat. No. 11,726,664, the disclosures of which are incorporated herein by reference in their entirety.

COPYRIGHT NOTICE

A portion of this disclosure contains material which is subject to copyright protection. The assignee of this application has no objection to the facsimile reproduction of this patent application including the copyrighted material, as it appears in the USPTO patent file or records, but otherwise reserves all copyrights whatsoever.

TECHNICAL FIELD

The present disclosure relates to cloud-based storage systems and more particularly to, a centralized cloud-based interface for protecting and managing data stored by cloud-based storage systems and data centers.

BACKGROUND

Various forms of storage systems are used today. These forms include direct attached storage (DAS) systems, network attached storage (NAS) systems, storage area networks (SANs), and others. Network storage systems are commonly used for a variety of purposes, such as providing multiple users with access to shared data, backing up data and others. A storage system typically includes at least one computing system executing a storage operating system for storing and retrieving data on behalf of one or more client computing systems ("clients"). The storage operating system stores and manages shared data containers in a set of mass storage devices. Storage systems are used by different applications, for example, database systems, electronic mail (email) servers, virtual machines executed within virtual machine environments (for example, a hypervisor operating environment) and others to store and protect data.

Storage today is also made available in a cloud computing environment where storage is presented and shared across different platforms. Cloud computing means computing capability that provides an abstraction between a computing resource and its underlying technical architecture (e.g., servers, storage, networks), enabling convenient, on-demand network access to a shared pool of configurable computing resources that may be rapidly provisioned and released with minimal management effort or service provider interaction. The term "cloud" herein is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. After the application layer is a cloud platform and cloud infrastructure, followed by a "server" layer that includes hardware and computer software designed for cloud specific services.

Managing storage objects across both cloud and on-premise data centers can be challenging because cloud providers may not have the expertise to understand both cloud based and on-premise storage. Continuous efforts are being made to develop technology to better manage storage and protect data stored in cloud platforms and/or on-premise data centers.

BRIEF DESCRIPTION OF THE DRAWINGS

The foregoing features and other features will now be described with reference to the drawings of the various aspects of the present disclosure. In the drawings, the same components have the same reference numerals. The illustrated aspects are intended to illustrate, but not to limit the present disclosure. The drawings include the following Figures:

FIG. 1D shows a process for executing a storage service using the SSUI, according to one aspect of the present disclosure;

FIG. 1G shows a process for using the SSUI, according to one aspect of the present disclosure;

DETAILED DESCRIPTION

In one aspect, innovative computing technology is provided for protecting data stored within a cloud infrastructure and/or in an on-premise data center using a single user interface (referred to as a storage service user interface ("SSUI"). A computing device accesses the SSUI via a network connection and interfaces with a software as a service layer (SaaS) layer to manage storage service operations from a cloud layer executing a storage micro-service. The SSUI can also communicate with an on-premise management system for executing storage services at an on-premise data center. The SSUI technology enables the computing device to easily provision storage and protect data by executing storage service operations across the cloud layer and the on-premise data center, as described below in detail.

As a preliminary note, the terms "component", "module", "system," and the like as used herein are intended to refer to a computer-related entity, either software-executing general-purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components may be stored, for example, at non-transitory, computer readable media including, but not limited to, an ASIC (application specific integrated circuit), CD (compact disc), DVD (digital video disk), ROM (read only memory), solid state drive, hard disk, EEPROM (electrically erasable programmable read only memory), non-volatile memory or any other storage device, in accordance with the claimed subject matter.

Figure 1A:
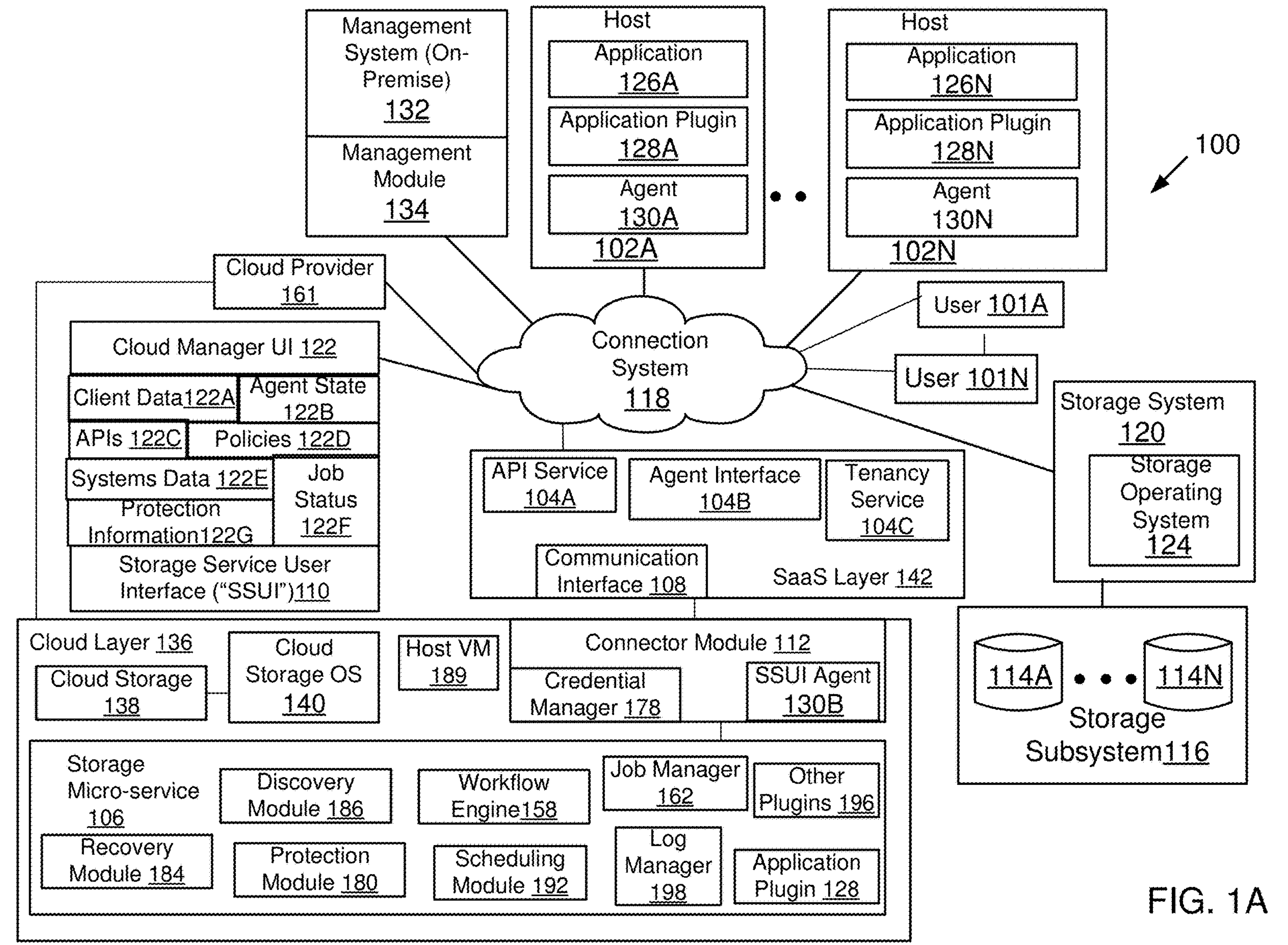
FIG. 1A shows an example of an operating environment with a centralized storage service user interface ("SSUI") for protecting and managing data stored in cloud platforms and on-premise data centers, according to various aspects of the present disclosure.

System 100/100A: FIG. 1A shows an example of a system 100, to implement the various adaptive aspects of the present disclosure. In one aspect, system 100 includes a cloud layer 136, a SaaS layer 142, a cloud provider 161 (e.g., Amazon Web Services ("AWS") provided by Amazon Inc, Azure provided by Microsoft Corporation, Google Cloud Platform provided by Alphabet Inc. (without derogation of any trademark rights of Amazon Inc., Microsoft Corporation or Alphabet Inc.), or any other cloud provider) and a cloud manager user interface (also referred to as "cloud manager") 122 with a SSUI 110, described below in detail. System 100 may also include one or more computing systems 102A-102N (shown as host 102, 102A-102N and may also be referred to as a "host system 102", "host systems 102", "server 102" or "servers 102") communicably coupled to a storage system 120 (may also be referred to as an "on-premise" storage system) executing a storage operating system 124 via a connection system 118 such as a local area network (LAN), wide area network (WAN), the Internet and others. As described herein, the term "communicably coupled" may refer to a direct connection, a network connection, or other connections to provide data-access service to user consoles (or computing devices) 101A-101N (may also be referred to as "user 101," "users 101," "client system 101" or "client systems 101").

Client systems 101 are computing devices that can access storage space at the storage system 120 via the connection system 118 or within the cloud layer 136 presented by the cloud provider 161 or any other entity. The client systems 101 can also access computing resources, like a host VM (virtual machine) 189 via the cloud layer 136. A client may be the entire system of a company, a department, a project unit or any other entity. Each client system is uniquely identified and optionally, may be a part of a logical structure called a storage tenant (not shown). The storage tenant represents a set of users (may also be referred to as storage consumers) for the cloud provider 161 that provides access to cloud-based storage and/or compute resources via the cloud layer 136 and/or storage managed by the storage system 120. In one aspect, the cloud layer 136 is configured as a virtual private cloud (VPC), a logically isolated section of a cloud infrastructure that simulates an on-premise data center.

In one aspect, the cloud manager 122 is a user interface provided to or by the cloud provider 161, e.g., AWS or any other cloud service. The cloud manager 122 is provided as a software application running on a computing device or a VM for configuring, protecting and managing storage objects. In one aspect, the SSUI 110 of the cloud manager 122 enables access to a storage service (e.g., backup, restore, cloning or any other storage related service) from a storage micro-service 106 made available from the cloud layer 136 via the SaaS layer 142. The SSUI 110 operates as a single pane application within the cloud manager 110 for providing access to data stored by system 100, configure storage and execute a storage service. A non-limiting example of a SaaS layer 142 is the "Azure Kubernetes Cluster," while a non-limiting example of the cloud layer 136 is a cloud platform provided by Alphabet Inc, Azure cloud platform provided by Microsoft Corporation, or AWS, without any derogation of any third party trademark rights.

Software applications today are built using "containers," which are also referred to as "micro-services." Kubernetes is an open-source software platform for deploying, managing and scaling such containers. Azure is a cloud computing platform provided by Microsoft Corporation (without derogation of any third-party trademark rights) for building, testing, deploying, and managing applications and services. Azure Kubernetes Service enables deployment of a production ready Kubernetes cluster in the Azure cloud. It is noteworthy that the adaptive aspects of the present disclosure are not limited to any specific cloud platform or the SaaS layer 142. The SSUI 110 can be implemented in various cloud configurations.

The term micro-service as used herein denotes computing technology for providing a specific functionality in system 100. As an example, the storage micro-service 106 may be deployed as a container (e.g. a "Docker" container), is stateless in nature, may be exposed as a REST (representational state transfer) application programming interface (API) and is discoverable by other services. Docker is a software framework for building and running micro-services using the Linux kernel (without derogation of any third-party trademark rights). The various aspects described herein are not limited to the Linux kernel. In one aspect, Docker micro-service code for the storage micro-service 106 is packaged as a "Docker image file". A Docker container is then initialized using an associated image file. A Docker container is an active or running instantiation of a Docker image. Each Docker container provides isolation and resembles a lightweight virtual machine. It is noteworthy that many Docker containers can run simultaneously in a same Linux computing system.

In one aspect, a plurality of data structures is used to implement the innovative aspects of the present disclosure. For example, the data structures include a client data structure 122A (may also be referred to as data structure 122A), an agent state data structure 122B (may also be referred to as data structure 122B), an API data structure 122C (may also be referred to as data structure 122C), a policies data structure 122D (may also be referred to as data structure 122D), a systems data structure 122E (may also be referred to as data structure 122E), a job status data structure 122F (may also be referred to as data structure 122F) and protection information 122G (may also be referred to as data structure 122G) are maintained to enable SSUI 110 to provide a storage service and provisioning ability, described below in detail. The various data structures are accessible to the cloud manager 122 and the SSUI 110. The data structures may be saved at one or more storage devices. It is noteworthy that the data structures 122A-122F can be implemented as a single data structure or multiple data structures.

In one aspect, data structure 122A stores user information including a user identifier, a network domain for the user device, a user account identifier, or any other information. The data structure 122B stores an indicator indicating if a cloud manager 122 instance with a unique identifier is operational and deployed. The data structure 122C stores APIs that are used by the cloud manager 122 and/or SSUI 110 for managing storage services and provisioning operations described below in detail. The data structure 122D stores one or more policy objects for each stored policy. The policy object may include one or more of a policy identifier, a policy name, policy description, a backup schedule policy, a retention count as to how long a backup is to be retained, a replication policy to replicate a backup from one location to another, types of backups, application consistent backups, and verification policies to verify a backup and others. It is noteworthy that a policy object may be shared across multiple application instances.

The data structure 122E stores system level information that identifies an application, an application type, the storage associated with the application, a policy associated with the application as well as protection status information for objects stored by the application. The data structure 122E stores an entry for each system that is added via SSUI 110. The data structure 122F is used by the SSUI 110 to track the progress of each job. The term job as used herein means a storage service operation, e.g., a backup, restore, clone or any other related operation. The data structure 122G stores protection information for each application instance. This information includes objects that are protected by backups, objects that are unprotected and objects that may need attention. The data structure 122G also stores topology information showing local backups taken from the cloud layer 136 and remote backups taken by the storage system 120. Details of using the data structures 122A-122F are described below with respect to FIGS. 1C-1G and 2A-2I.

In one aspect, the SaaS layer 142 includes an API service 104A, an agent interface 104B and a tenancy service 104C. The term "service" as used herein means executing code for providing a certain function, as described below in detail. A communication interface 108 enables communication between the SaaS layer 142 and the cloud layer 136. Details of using these various components of the SaaS layer 142 are provided below.

In one aspect, the cloud layer 136 includes a connector module 112 with a credential manager module (also referred to as "credential manager") 178 and a SSUI agent 130B, and executes the storage micro-service 106, details of which are provided below. It is noteworthy that although a single block is shown for the storage micro-service 106, multiple instances of the micro-service can be executed at any given time to accommodate multiple user systems 101.

In one aspect, the cloud layer 136 includes or has access to a cloud-based storage system ("cloud storage OS") 140. An example of the cloud storage OS 140 is "CLOUD ONTAP" provided by NetApp Inc., the assignee of this application. (without derogation of any trademark rights) The cloud storage OS 140 is a software defined version of the storage operating system 124 executed within the cloud layer 136 or accessible to the cloud layer 136 to provide storage and storage management options that are available via the storage system 120. The cloud storage OS 140 has access to cloud storage 138, which may include block-based, persistent storage that is local to the cloud storage OS 140 and object-based storage that may be remote to the cloud storage OS 140.

In another aspect, in addition to cloud storage OS 140, a cloud-based storage service is made available from the cloud layer 136 to present storage volumes and manage backups of the storage volumes. An example of the cloud-based storage service is the Cloud Volume Service, provided by NetApp Inc. (without derogation of any trademark rights). The various aspects of the present disclosure may include both the Cloud storage OS 140 and the cloud-based storage service or either one of them. Details of using the various components of the cloud layer 136 are provided below.

In one aspect, the SSUI 110 is loaded within the cloud manager 122 as a single page application. AngularJS, Cascading Style Sheets ("CSS") and HTML (Hyper Text Markup Language) based technologies may be used as a development framework to develop the SSUI 110. SSUI 110 can loaded using an "iFrame," an inline frame used inside a webpage to load another element. To access a storage service or manage a storage object, a client device 111 sends an authorization token to access the SSUI 110. The authorization token includes identification information of the user. The authorization token is forwarded by the SSUI 110 to the API service 104A that maintains or has access to authorized user information to authenticate the authorization token. The API service 104A adds a header to the authentication token with a user account identifier, and an identifier that identifies an instance of the cloud manager 122.

Upon authentication, the tenancy service 104C either creates or selects an "operating node" within the cloud layer 136. The operating node in this context means a computing resource (or a virtual machine) that can be made available to the client 111 for the requested storage service. Thereafter, the agent interface 104B deploys the connector module 112 within the cloud layer 136. The connector module 112 is a communication portal that sends to and receives messages from the SaaS layer 142. Thereafter, the credential manager 178 receives the authenticated token with the updated header from the communication interface 108 to initiate the SSUI agent 130B in the connector module 112. The SSUI agent 130B is configured to interface with the storage micro-service 106, as described below in detail.

To process a request for a storage service, the SSUI agent 130B deploys the storage micro-service 106. The storage micro-service 106 can be deployed from an elastic container registry (ECR). As an example, ECR is provided by AWS (without derogation of any third-party trademark rights) and is a managed container registry that stores, manages, and deploys container images. The storage service request is authorized by making a call to the tenancy service 104C that determines if the user making the storage service request is authorized to request the storage service. If yes, the storage service is executed by the storage micro-service 106, as described below in detail.

In one aspect, the storage micro-service 106 includes various functional components, e.g. a discovery module 186, a recovery module 184, a workflow engine 158, a job manager 162, a protection module 180, a scheduling module (also referred to as "scheduler") 192, a log manager 198, an application plugin 128 and other plugins 196. The term plugin as used in this specification means a processor executable layer that is customized to interface with a specific application, e.g. a database application, a file system, an operating system, virtual machine monitor layer and others. The term protect means to backup an application and/or backup associated information (including configuration information, data (e.g. files, directories, structured or unstructured data, may jointly be referred to as data containers) and others).

The application plugin 128 is configured to interface with an application for example, a database application and provides APIs to communicate with the application. The other plugins 196 include an operating system plugin that can interface with an operating system of host VM 189, a VM plugin that can interface with a VM monitor (e.g., a hypervisor layer) and a storage system plugin that can interface with the cloud storage OS 140 for retrieving information regarding storage objects. The term storage object means a logical object that is used to store information, e.g. a storage volume, a logical unit number (LUN), or any other object.

The protection module 180 manages and coordinates backup and cloning operations for stored objects, the recovery module 184 manages and coordinates restore operations to restore a storage object, and the discovery module 186 manages and coordinates discovery operations related to stored objects. The scheduling module 192 schedules storage service and discovery operations, for example, backup, cloning and restore operations. The log manager 198 manages logs for backup operations. The workflow engine 158 coordinates and manages various tasks that are performed by the different components of the storage micro-service 106. The job manager 162 executes operations for tracking the status of different jobs, including backups, cloning and restore operations, and updates the SSUI 110. Based on the updates, data structure 122F is updated and is used to present a job status from SSUI 110, as described below in detail.

In one aspect, host systems 102A-102N of system 100 are configured to execute a plurality of processor-executable applications 126A-126N (may also be referred to as "application 126" or "applications 126"), for example, a database application, an email server, and others. These applications may be executed in different operating environments, for example, a virtual machine environment, Windows, Solaris, Unix (without derogation of any third-party rights) and others. The applications 126 use storage system 120 to store information at storage devices, as described below. Although hosts 102 are shown as stand-alone computing devices, they may be made available from the cloud layer 136 as compute nodes executing applications 126 within VMs (shown as host VM 189).

To protect information associated with each application, for an on-premise system, a plugin module (shown as application plugins 128A-128N) are executed at host systems 102. Each host system 102 may also execute an agent 130A-130N (similar to the SSUI agent 130B) that interfaces with the management module 134 of the management system 132 and the various application plugins for managing backups, restore, cloning and other operations for a non-cloud-based storage system, e.g. storage system 120. In this context the management system 132 is referred to as an "on-premise" management system. Although the management system 132 with the management module 134 is shown as a stand-alone module, it may be implemented with other applications, for example, within a virtual machine environment. Furthermore, the management system 132 and the management module 134 may also be referred to interchangeably throughout this specification.

In one aspect, the on-premise, storage system 120 has access to a set of mass storage devices 114A-114N (may also be referred to as "storage devices 114" or "storage device 114") within at least one storage subsystem 116. The storage devices 114 may include writable storage device media such as solid state drives, storage class memory, magnetic disks, video tape, optical, DVD, magnetic tape, non-volatile memory devices, for example, self-encrypting drives, or any other storage media adapted to store structured or non-structured data. The storage devices 114 may be organized as one or more groups of Redundant Array of Independent (or Inexpensive) Disks (RAID). The various aspects disclosed are not limited to any specific storage device or storage device configuration.

The storage system 120 provides a set of storage volumes (may also be referred to as "volumes") directly to host systems 102 via the connection system 118. The storage volumes can also be presented by the cloud storage OS 140, and in that context a storage volume is referred to as a "cloud volume." The storage operating system 124/cloud storage OS 140 present or export data stored at storage devices 114/cloud storage 138 as a volume (or a logical unit number (LUN) for storage area network ("SAN") based storage). Each volume or cloud volume is a logical object, also referred to as a storage object, configured to store data files (or data containers or data objects), scripts, word processing documents, executable programs, and any other type of structured or unstructured data. From the perspective of one of the client systems, each volume can appear to be a single storage drive. However, each volume can represent the storage space in one storage device, an aggregate of some or all the storage space in multiple storage devices, a RAID group, or any other suitable set of storage space.

The storage system 120/cloud storage OS 140 are used to store and manage information at storage devices 114/cloud storage 138 based on a request generated by application 126, user 101 or any other entity. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols for SAN storage, for example, the Small Computer Systems Interface (SCSI) protocol encapsulated over TCP (iSCSI) and SCSI encapsulated over Fibre Channel (FC), object-based protocol or any other protocol.

In a typical mode of operation, one or more input/output (I/O) requests are sent over connection system 118 to the storage system 120 or the cloud storage OS 140, based on the request. Storage system 120/cloud storage OS 140 receives the I/O requests, issues one or more I/O commands to storage devices 114/cloud storage 138 to read or write the data on behalf of the host system 102, and issues a response containing the requested data over the network 118 to the respective host system 102.

Although storage system 120 is shown as a stand-alone system, i.e. a non-cluster-based system, in another aspect, storage system 120 may have a distributed architecture; for example, a cluster-based system that may include a separate network module and storage module. Briefly, the network module is used to communicate with host systems 102, while the storage module is used to communicate with the storage devices 114.

Alternatively, storage system 120 may have an integrated architecture, where the network and data components are included within a single chassis. The storage system 120 further may be coupled through a switching fabric to other similar storage systems (not shown) which have their own local storage subsystems. In this way, all the storage subsystems can form a single storage pool, to which any client of any of the storage servers has access.

In one aspect, the storage system 120 can be organized into any suitable number of virtual servers (may also be referred to as "VServers" or virtual storage machines), in which each VServer represents a single storage system namespace with separate network access. Each VServer has a specific client domain and a security domain that are separate from the client and security domains of other VServers. Moreover, each VServer can span one or more physical nodes, each of which can hold storage associated with one or more VServers. Client systems 111 can access the data on a VServer from any node of the clustered system, through the virtual interface associated with that VServer. It is noteworthy that the aspects described herein are not limited to the use of VServers.

As an example, one or more of the host systems (for example, 102A-102N) or a compute resource (not shown) of the cloud layer 130 may execute a VM environment where a physical resource is time-shared among a plurality of independently operating processor executable VMs (including host VM 189). Each VM may function as a self-contained platform, running its own operating system (OS) and computer executable, application software. The computer executable instructions running in a VM may also be collectively referred to herein as "guest software." In addition, resources available within the VM may also be referred to herein as "guest resources."

The guest software expects to operate as if it were running on a dedicated computer rather than in a VM. That is, the guest software expects to control various events and have access to hardware resources on a physical computing system (may also be referred to as a host system) which may also be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

Figure 1B:
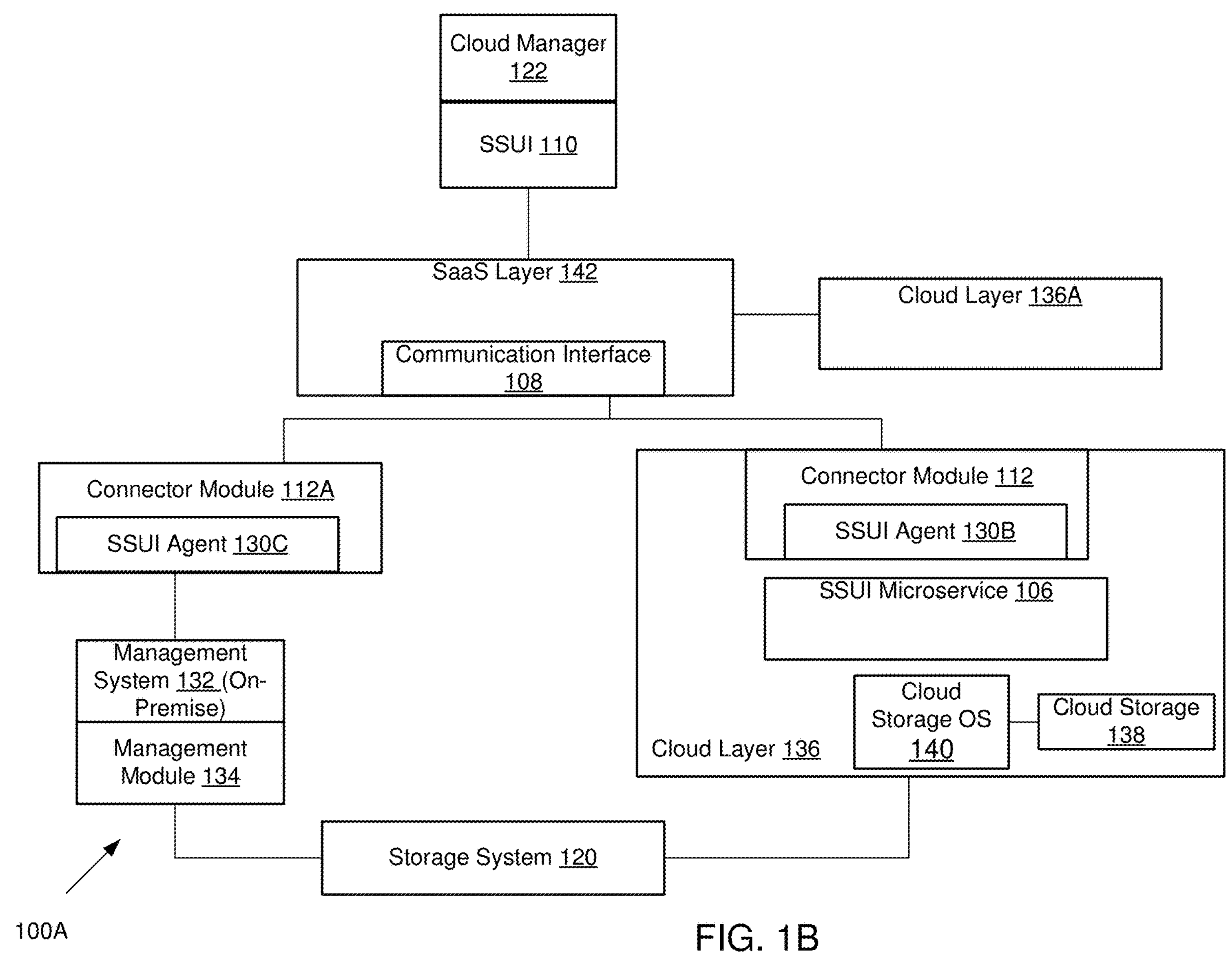
FIG. 1B shows an example of the SSUI interfacing with cloud platforms and on-premise data centers, according to one aspect of the present disclosure.

FIG. 1B shows an example of a system 100A using the SSUI 110 with cloud layers 136 and 136A (similar to 136) and the on-premises storage system 120. The SaaS layer 142 interfaces with a first connector module 112A (similar to 112) that hosts a SSUI agent 130C (similar to 130B). The SSUI agent 130C interfaces with the on-premise, management system 132 that can communicate with the storage system 120. The connector module 112, as described above, enables communication between the cloud layer 136 and the SaaS layer 142. The SSUI 110 is able to provide storage services to both the on-premise and cloud-based storage systems, as described below in detail.

Figure 1C:
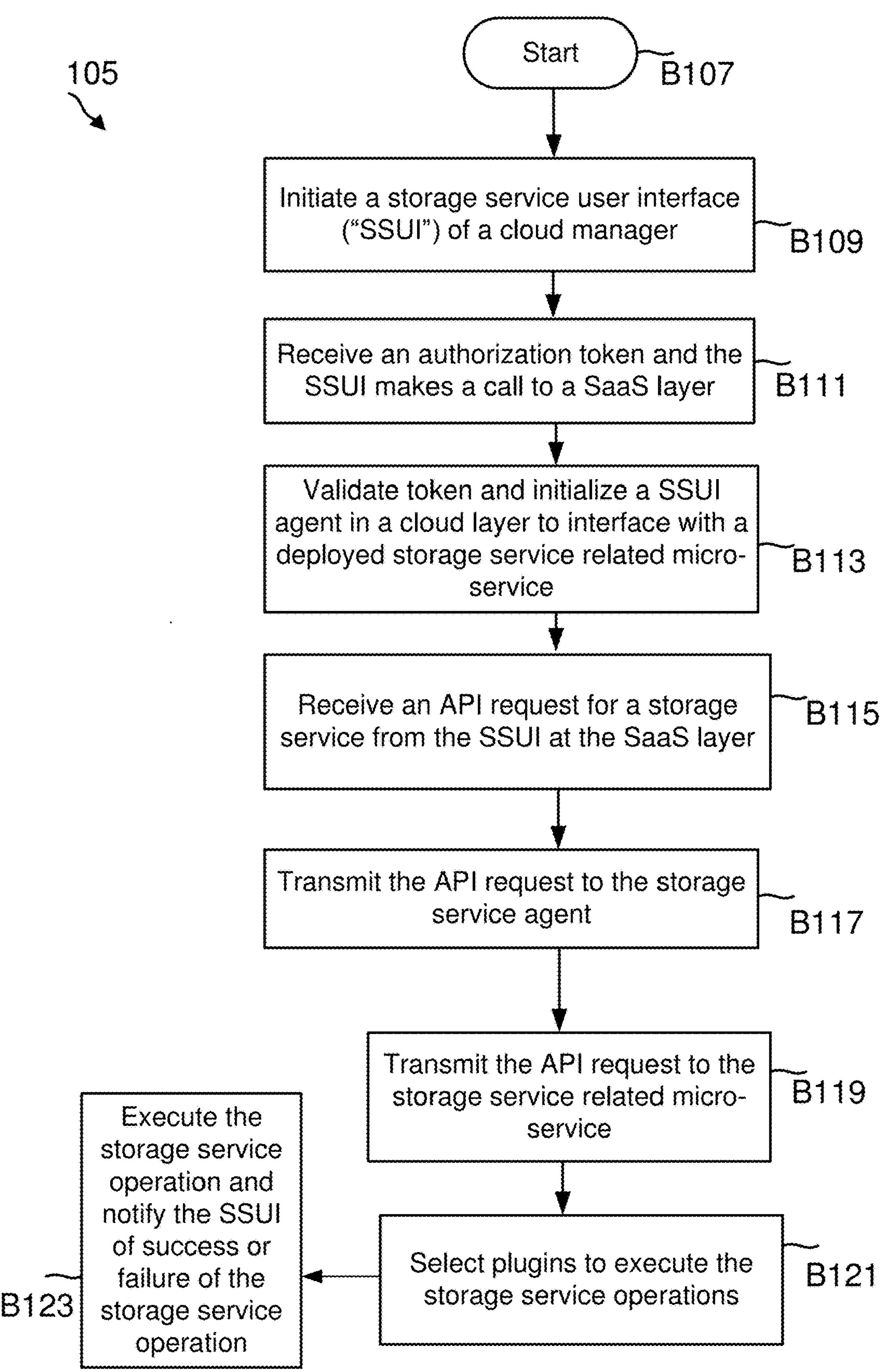
FIG. 1C shows a process for enabling the SSUI in the system of FIG. 1A, according to one aspect of the present disclosure.

Process Flows: FIG. 1C shows a process 105 for initializing and enabling the SSUI 110 in the cloud manager 122, according to one aspect of the present disclosure. The process 105 begins in block B107, when a user system 111 is connected to the cloud manager 122 via a network connection, e.g., using connection system 118 (FIG. 1A). The user 111 logs into the cloud manager 122 with user credentials (e.g., a username and password). The cloud manager 122 using the data structure 122A authenticates the user. If the user does not have an account, one is created via the cloud manager 122 or a user interface is provided directly by the cloud provider 161. If the user account is not associated with the storage micro-service 106, then one is provisioned/assigned from the cloud manager 122 (e.g., shown as cluster configuration in FIG. 2B). The term cluster configuration in FIG. 2B means configuring the storage micro-service 106. In one aspect, the storage micro-service 106 can be configured as a "high-availability" pair, which implies that if one instance of the storage micro-service 106 becomes unavailable, another instance of the storage micro-service 106 provides a storage service.

In block B109, the SSUI 110 is loaded using a uniform resource locator (URL) for the SSUI 110. To access services offered by the SSUI 110, additional authentication may be performed. For example, in block B111, an authorization token is received from the user 111 for a storage service. The token may identify a network domain, a client identifier, and a destination. The token is sent to the SaaS layer 142 for authentication by SSUI 110.

Figure 2A:
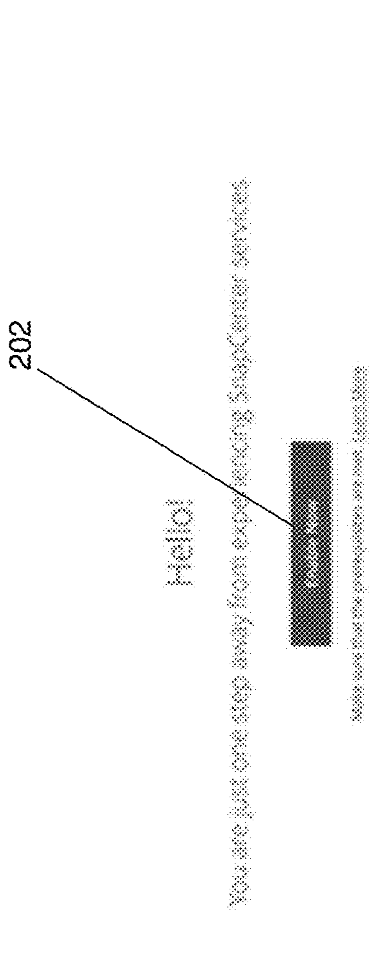
FIG. 2A shows a welcome screen to access the SSUI, according to one aspect of the present disclosure.
Figure 2A:
Figure 2A:
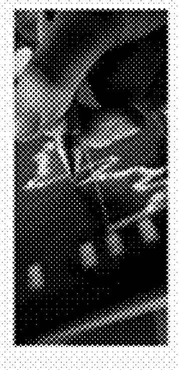
Figure 2A:
Figure 2A:
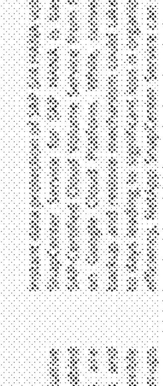
Figure 2A:
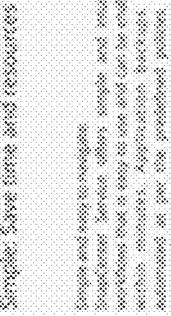
Figure 2A:
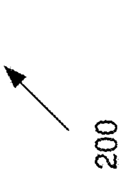
Figure 2B:
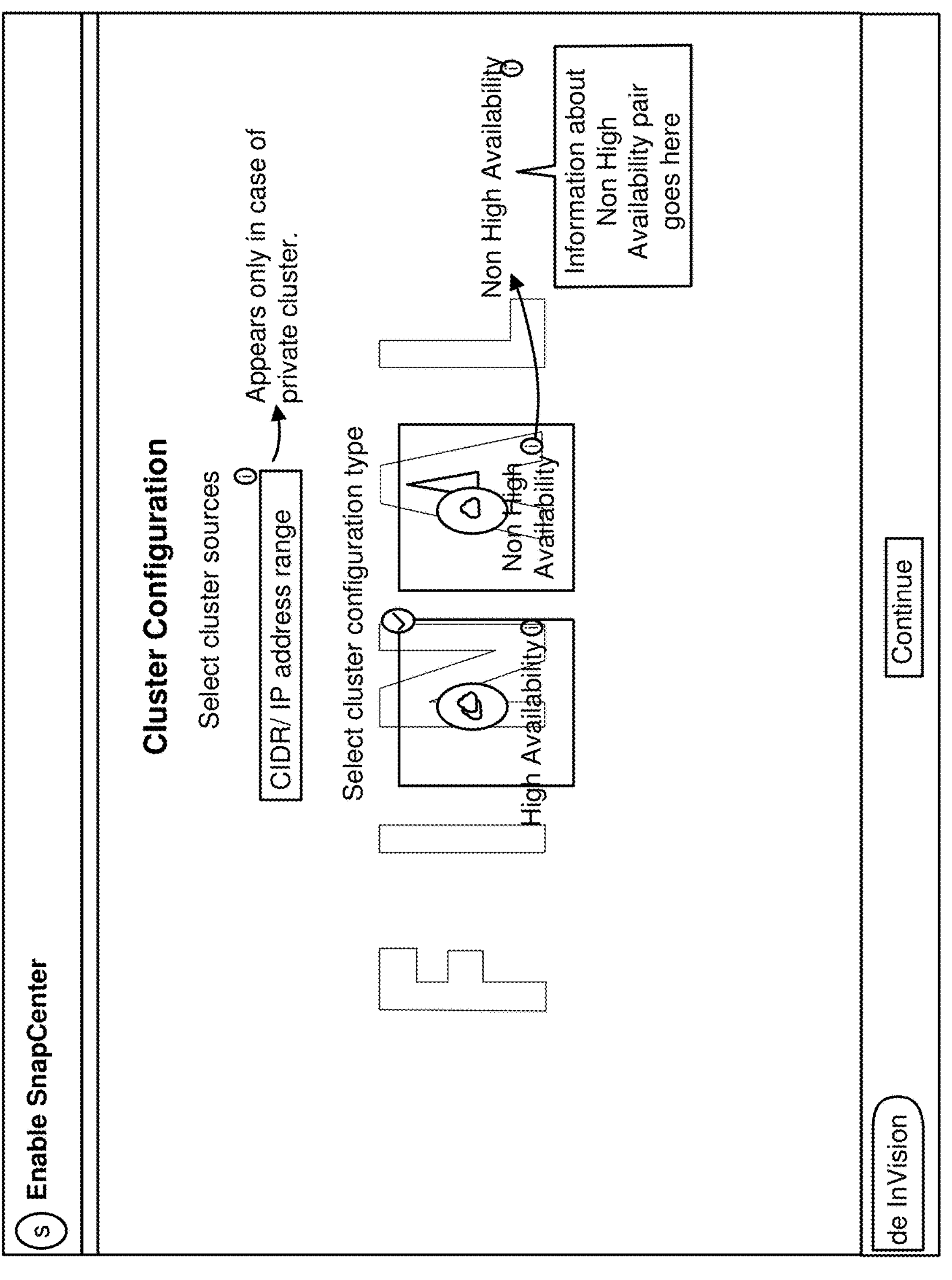
FIG. 2B shows a screen for assigning storage for an application, according to one aspect of the present disclosure.

In block B113, the API service 104A of the SaaS layer 142 authenticates the token and adds a message header. The message header identifies an account, and an identifier of the cloud manager 122 instance. The account identifier identifies the tenancy service 104C that the user is logged into. The agent interface 104B then deploys the connector module 112 in the cloud layer 136 by making an API call via the communication interface 108. The connector module 112 includes the SSUI agent 130B as a container. The storage micro-service 106 also becomes available for a storage service, as described below in detail. It is noteworthy that if the storage micro-service 106 has not been configured for the user, one is configured, as shown in FIG. 2B.

Figure 2C:
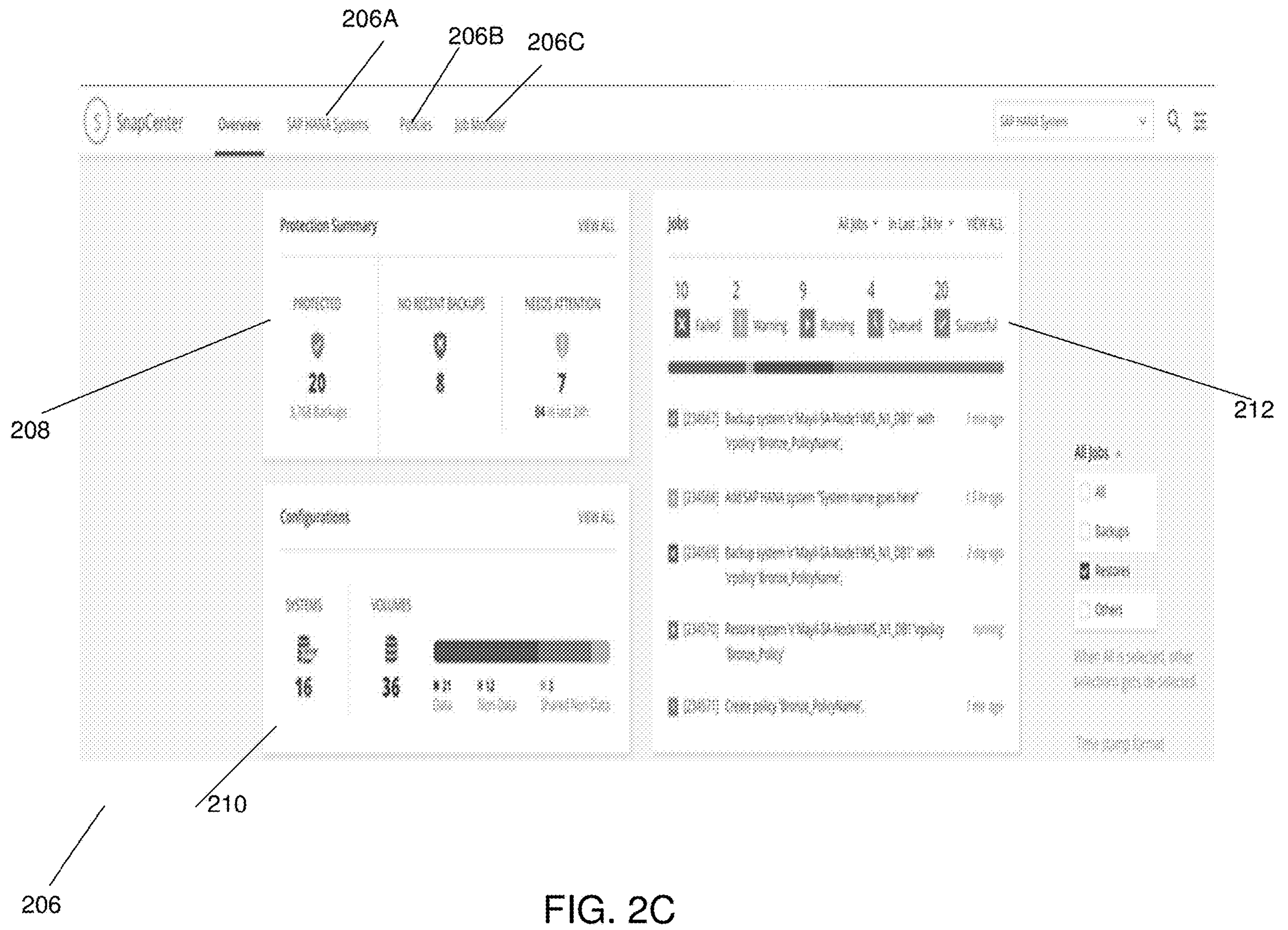
FIG. 2C shows an overview screen presented by the SSUI for an application instance, according to one aspect of the present disclosure.

In block B115, an API request for a storage service is received from the SSUI 110 at the SasS layer 142. The API request may be for a scheduled service, e.g., a backup, or for an on-demand service, e.g., an on-demand, backup, clone or restore operation. In block B117, the API request is forwarded to the SSUI agent 130B by the SaaS layer 142 via the communication interface 108. The storage service request is authenticated by the credential manager 178 to ensure that the user is authorized for the specific service. Thereafter, the SSUI agent 130B deploys the storage micro-service 106 from an elastic container registry maintained for the cloud manager 122 to execute the storage service. In block B119, the API request is provided to the storage micro-service 106. Based on the request type, the appropriate plugin (e.g. 128) is selected in block B121. For example, if the storage service involves a database application, then the plugin associated for the database application is deployed to coordinate the storage service. The database plugin also calls other plugins, e.g., a storage plugin that interfaces with the cloud storage OS 140 to obtain the storage footprint associated with the storage service. The storage service is executed in block B123 and the SSUI 110 is notified of the success or failure of the storage service. The SSUI 110 updates data structure 122F indicating the status of the storage service. In one aspect, the progress of the storage service is presented via the SSUI 110, as shown in FIG. 2I, described below in detail.

FIG. 1D shows another process 131 for initializing and enabling the SSUI 110, according to one aspect of the present disclosure. The process 131 begins in block B133, when a user system 111 is connected to the cloud manager 122 via a network connection. The user 111 logs into the cloud manager with user credentials. The cloud manager 122 using data structure 122A authenticates the user 111. If the user 111 does not have an account, one is created via the cloud manager 122 or a user interface provided directly by the cloud provider 161. If the user account is not associated with a storage micro-service 106, then one is assigned/provisioned from the cloud manager 122 (shown in FIG. 2B).

In block B135, the SSUI 110 is loaded using a uniform resource locator (URL) for the SSUI 110. To use services offered by the SSUI 110, additional authentication is performed. For example, an authorization token is received from the user 111. The token may identify a network domain, a client identifier, and a destination. The token is sent to the SaaS layer 142 for authentication. The API service 104A authenticates the token and adds a message header. The message header identifies an account, and an identifier of the cloud manager 122 instance. The account identifier identifies the tenancy service 104C that the user is logged into. The agent interface 104B then deploys the connector module 112 in the cloud layer 136 by making an API call via the communication interface 108. The connector module 112 includes the SSUI agent 130B as a container. The storage micro-service 106 also becomes available for a storage service, as described below in detail.

In block B137, an API request is received by the SasS layer 142 from the SSUI 110. The request may be for a scheduled service, e.g., a backup, or for an on-demand service, e.g., an on-demand, backup, clone or restore operation. A backup may include taking a snapshot i.e. a point-in-time copy of a storage volume. The point-in-time copy captures all the information in a storage volume.

In block B139, the API request is forwarded to the SSUI agent 130B in the cloud layer 136. The API request is authenticated by the credential manager 178. Thereafter, the SSUI agent 130B deploys the storage micro-service 106 from an elastic container registry maintained for the cloud manager 122 to execute the storage service. Based on the request type, the appropriate plugin is identified in block B141. For example, if the storage service involves a database application, then the plugin associated for the database application is deployed to coordinate the storage service. The database plugin also calls other plugins, e.g., a storage plugin that interfaces with the cloud storage OS 140 to obtain the storage footprint associated with the storage service. The storage service is executed in block B143 and the SSUI 110 is notified of the success or failure of the storage service in block B145. In one aspect, the progress of the storage service is presented via the SSUI 110, as shown in FIG. 2I, described below in detail.

Figure 1E:
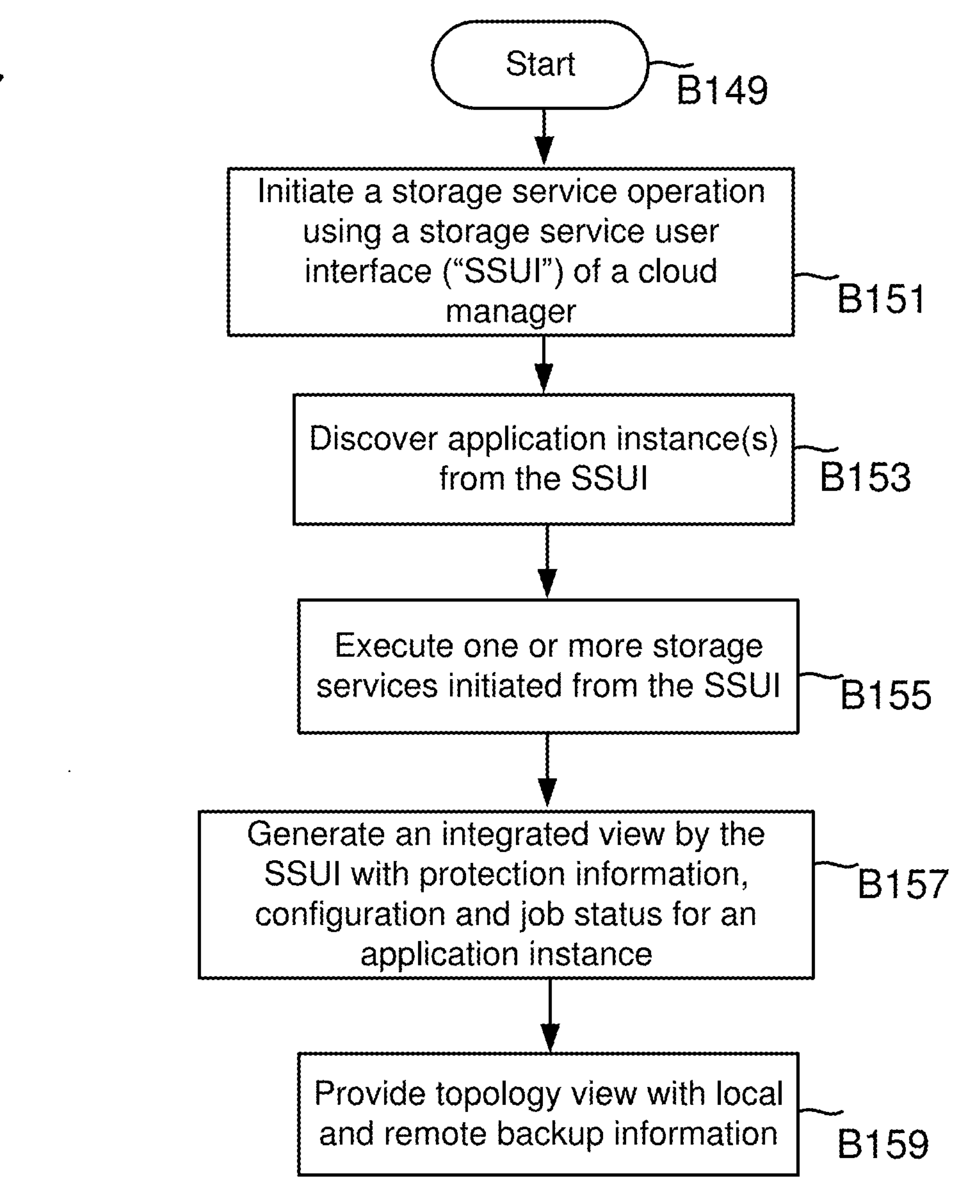
FIG. 1E shows a process for presenting an integrated view of a storage system by the SSUI, according to one aspect of the present disclosure.

FIG. 1E shows a process 147 for using the SSUI 110 in system 100, according to one aspect of the present disclosure. The process 147 begins in block B149, when a user system 111 is connected to the cloud manager 122 via a network connection. The user 111 logs into the cloud manager 122 with user credentials. The cloud manager 122 using data structure 122A authenticates the user 111. If the user 111 does not have an account, one is created via the cloud manager 122 or a user interface provided directly by the cloud provider 161. If the user account is not associated with a storage micro-service 106, then one is assigned/provisioned from the cloud manager 122 (shown in FIG. 2B).

In block B151, the SSUI 110 is loaded from a uniform resource locator (URL). To use the services offered by the SSUI 110, additional authentication is performed. For example, an authorization token is received from the user 111. The token may identify a network domain, a client identifier, and a destination (or "audience"). The token is sent to the SaaS layer 142 for authentication. The API service 104A of the SaaS layer 142 authenticates the token and adds a message header. The message header identifies an account, and an identifier of the cloud manager instance. The account identifier identifies the tenancy service that the user is logged into. The agent interface 104B then deploys the connector module 112 in the cloud layer 136 by making an API call via the communication interface 108. The connector module 112 includes the SSUI agent 130B as a container. The storage micro-service 106 also becomes available for a storage service, as described below in detail.

In block B153, an application instance is discovered by the SSUI 110. The application instance identifies an application that is executed for a user. This information is obtained from data structure 122E.

In block B155, an API request is received by the SasS layer 142 from SSUI 110. The request may be for a scheduled service, e.g., a backup, or for an on-demand service, e.g., an on-demand, backup, clone or restore operation. The API request is forwarded to the SSUI agent 130B in the cloud layer 136. The storage service request is authenticated by the credential manager 178. Thereafter, the SSUI agent 130B deploys the storage micro-service 106 from an elastic container registry maintained for the cloud manager 122 to execute the storage service. Based on the request type, the appropriate plugin is identified for the storage service. For example, if the storage service involves a database application, then the plugin associated for the database application is deployed to coordinate the storage service. The database plugin also calls other plugins, e.g., a storage plugin that interfaces with the cloud storage OS 140 to obtain the storage footprint associated with the database application. The storage service is executed and the SSUI 110 is notified of the success or failure of the storage service. In one aspect, the progress of the storage service is presented via the SSUI 110, as shown in FIG. 2I, described below in detail.

In block B157, an integrated view is presented by the SSUI 110 using data structure 122G. An example of the integrated view is shown in FIG. 2C, described below in detail. The integrated view indicates the storage objects that are protected, unprotected, items that need attention, configuration information of the storage volumes that are used, and a job status. This enables a user to better manage stored objects.

In block B159, a topology view can be presented for the application instance by the SSUI 110 using data structure 122G. An example of the topology view is shown in FIG. 2G. The topology view shows local backups that are taken in the cloud layer 136, remote backups that are taken by the storage system 120 and any secondary backup copies of the remote backups.

Figure 1F:
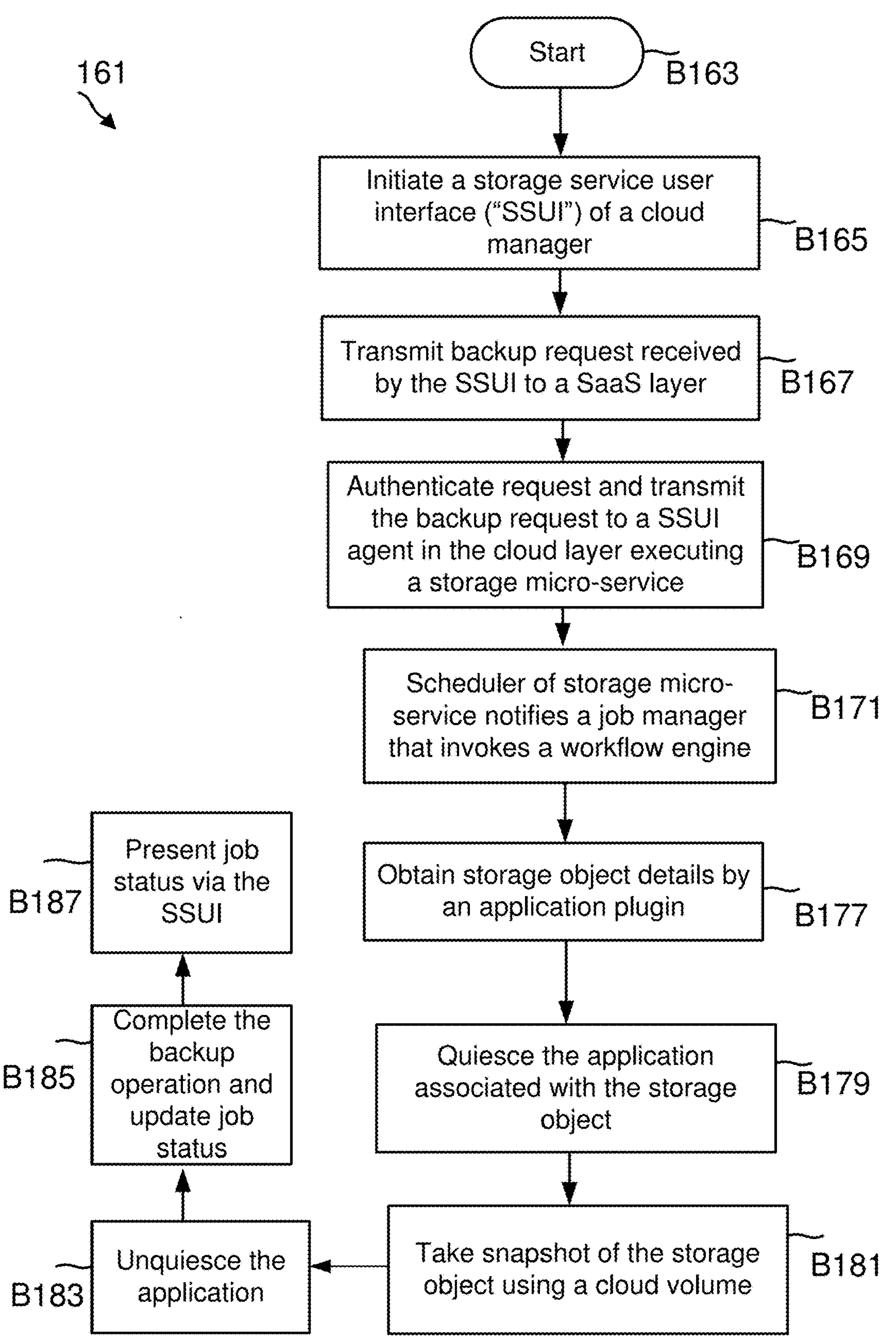
FIG. 1F shows a process for executing a backup operation using the SSUI, according to one aspect of the present disclosure.

FIG. 1F shows a process 161 for executing a backup operation, using the SSUI 110 and the storage micro-service 106, according to one aspect of the present disclosure. The process begins in block B163, when a user system 111 is connected to the cloud manager 122 via a network connection. The user 111 logs into the cloud manager 122 with user credentials. The cloud manager 122 using data structure 122A authenticates the user 111. If the user does not have an account, one is created via the cloud manager 122 or via a user interface provided directly by the cloud provider 161. If the user account does not have assigned storage micro-service, then it is assigned/provisioned from the cloud manager 122 (shown in FIG. 2B).

In block B165, the SSUI 110 is loaded from a uniform resource locator (URL) and a backup request is received to backup a stored container, e.g. a database. The backup request includes an authorization token. The token may identify a network domain, a client identifier, and a destination (or "audience").

In block B167, the backup request with the token is sent by the SSUI 110 to the SaaS layer 142 for authentication.

In block B169, the API service 104A of the SaaS layer 142 authenticates the token and adds a message header. The message header identifies an account, and an identifier of the cloud manager instance. The account identifier identifies the tenancy service 104C that the user is logged into. The agent interface 104B then deploys the connector module 112 in the cloud layer 136 by making an API call via the communication interface 108. The connector module 112 includes the SSUI agent 130B as a container. The backup request is forwarded to the SSUI agent 130B in the cloud layer 136. Thereafter, the SSUI agent 130B deploys the storage micro-service 106 from an elastic container registry maintained for the cloud manager 122.

In block B171, the scheduling module 192 of the storage micro-service 106 notifies the job manager 162 of the backup request. The job manager 162 creates a job identifier and invokes the workflow engine 158 to initiate the various tasks associated with the backup operation.

In block B177, the plugin associated with the database instructs the discovery module 186 to obtain information regarding the database, e.g., a size of the database, location where the database is stored and other information. The policy details of the database are also obtained. The policy details provide information regarding how the backup needs to be conducted. The database application is then quiesced by the plugin in block B179. A snapshot is taken of the database based on the associated policy in block B181. The database application is unquiesced in block B183. The backup operation is then completed in block B185 after the data structure 122G is updated. The update includes an indication of whether the backup was local or remote. It is noteworthy that while the various tasks are being completed, the job manager 162 continues to provide updates to SSUI 110 such the progress of the backup operation can be presented in block B187, as shown in FIG. 2I, described below in detail.

FIG. 1G shows a process 187 for using the SSUI 110 in system 100/100A, according to one aspect of the present disclosure. The process 187 begins in block B187A, when a user system 111 is connected to the cloud manager 122 via a network connection. The user 111 logs into the cloud manager 122 with user credentials. The cloud manager 122 using data structure 122A authenticates the user 111. If the user 111 does not have an account, one is created via the cloud manager 122 or a user interface provided directly by the cloud provider 161.

In block B187B, the SSUI 110 is loaded from a uniform resource locator (URL). To use the services offered by the SSUI 110, additional authentication is performed. For example, an authorization token is received from the user 111. The token may identify a network domain, a client identifier, and a destination (or "audience"). The token is sent to the SaaS layer 142 for authentication. The API service 104A of the SaaS layer 142 authenticates the token and adds a message header. The message header identifies an account, and an identifier of the cloud manager 122 instance. The account identifier identifies the tenancy service 104C that the user is logged into. The agent interface 104B then deploys the connector module 112 in the cloud layer 136 by making an API call via the communication interface 108. The connector module 112 includes the SSUI agent 130B as a container. The storage micro-service 106 also becomes available for a storage service.

In block B187C, an application instance is added for the user 111 via SSUI 110. An example of adding the application instance (or system) is shown in FIG. 2E. Storage is also provisioned for the system from the SSUI 110. An example of provisioning storage is shown in FIG. 2F. A policy is also associated with the application instance. The policy may include a policy identifier, a policy name, description, a backup schedule policy, a retention count as to how long a backup is to be retained, a replication policy to replicate a backup from one location to another, types of backups, application consistent backups, and verification policies to verify a backup and others. Thereafter, SSUI 110 updates data structures 122E and 122D.

In block B187D, an API request is received by the SSUI 110. The request may be for a scheduled service, e.g., a backup, or for an on-demand service, e.g., an on-demand, backup, clone or restore operation. The API request is forwarded to the SaaS layer 142 that forwards the request to SSUI agent 130B in the cloud layer 136, when the request is for cloud-based storage. The storage service request is authenticated by the credential manager 178. Thereafter, the SSUI agent 130B deploys the storage micro-service 106 from an elastic container registry maintained for the cloud manager 122 to execute the storage service. Based on the request type, the appropriate plugin is identified for the storage service. For example, if the storage service involves a database application, then the plugin associated for the database application is deployed to coordinate the storage service. The database plugin also calls other plugins, e.g., a storage plugin that interfaces with the cloud storage OS 140 to obtain the storage footprint associated with the database application. The storage service is executed and the SSUI 110 is notified of the success or failure of the storage service. When the API request involves on-premise storage system 120, then the API request is sent to the on-premise management system 132 to execute the storage service.

In block B187E, the SSUI 110 receives updates regarding the storage service request. The updates are received from the storage micro-service 106 or the management system 132, depending on the request. The SSUI 110 updates data structure 122F to track the progress of the storage service.

In block B187F. the SSUI 110 also tracks the protection status of storage objects stored for the application instance in data structure 122G.

In block B187G, an integrated view is presented by the SSUI 110 using data structure 122G. An example of the integrated view is shown in FIG. 2C, described below in detail. The integrated view indicates the storage objects that are protected, unprotected, items that need attention, configuration information of the storage volumes that are used, and a job status.

In block B159, a topology view can be presented for the application instance by the SSUI 110 using data structure 122G. An example of the topology view is shown in FIG. 2G. The topology view shows local backups that are taken in the cloud layer 136, remote backups that are taken by the storage system 120 and any secondary backup copies of the remote backups.

SSUI Screen Shots: FIG. 2A shows a welcome screen 200 for storage provisioning and storage services from SSUI 110, according to one aspect of the present disclosure. Screen 200 is presented on a display screen when certain prerequisites have been met, e.g., a user account is active with the cloud provider 161 and if a storage has been configured. If the prerequisites are not met, then by selecting option 202, the user account and a storage micro-service (e.g. 106, FIG. 1A) can be configured. FIG. 2B shows a screenshot 204 for configuring the storage micro-service 106. In one aspect, the storage micro-service 106 can be configured as a "high-availability" service. The term "cluster configuration" in FIG. 2B means storage micro-service 106 configuration. This means that if one instance of the micro-service becomes unavailable, then another instance processes the storage services.

FIG. 2C shows an example of an overview page 206 for a user system, according to one aspect of the present disclosure. The overview page 206 has a protection summary segment 208 that indicates the number of storage objects that have been backed, the number of storage objects without a recent backup and items that may need attention. The protection summary is generated from the data structure 122G. Segment 210 shows an overview of the configuration of supported systems and volumes generated from data structure 122E, while segment 212 shows a status of the various current jobs that are being executed in the cloud layer 136 as well as by storage system 120, based on data structure 122F. The overview page includes various tabs 206A-206C. Tab 206A provides system details (shown as an example, "SAP HANA Systems", without derogation of any third-party trademark rights, tab 206B is a policies tab 206B and tab 206C is a job monitor tab 206C that are described below in detail.

Figure 2D:
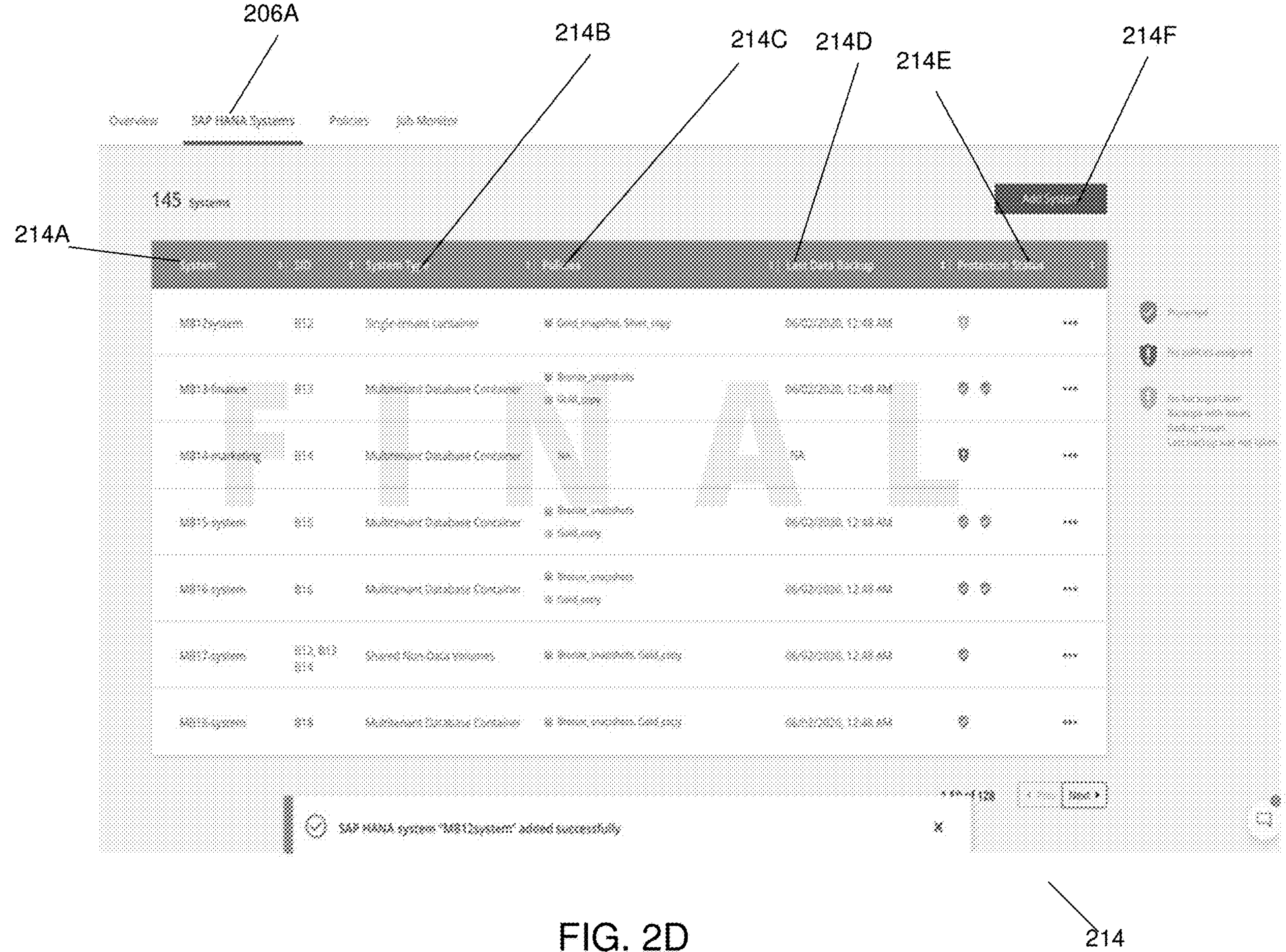
FIG. 2D shows a system level view presented by the SSUI for a user system, according to one aspect of the present disclosure.
Figure 2E:
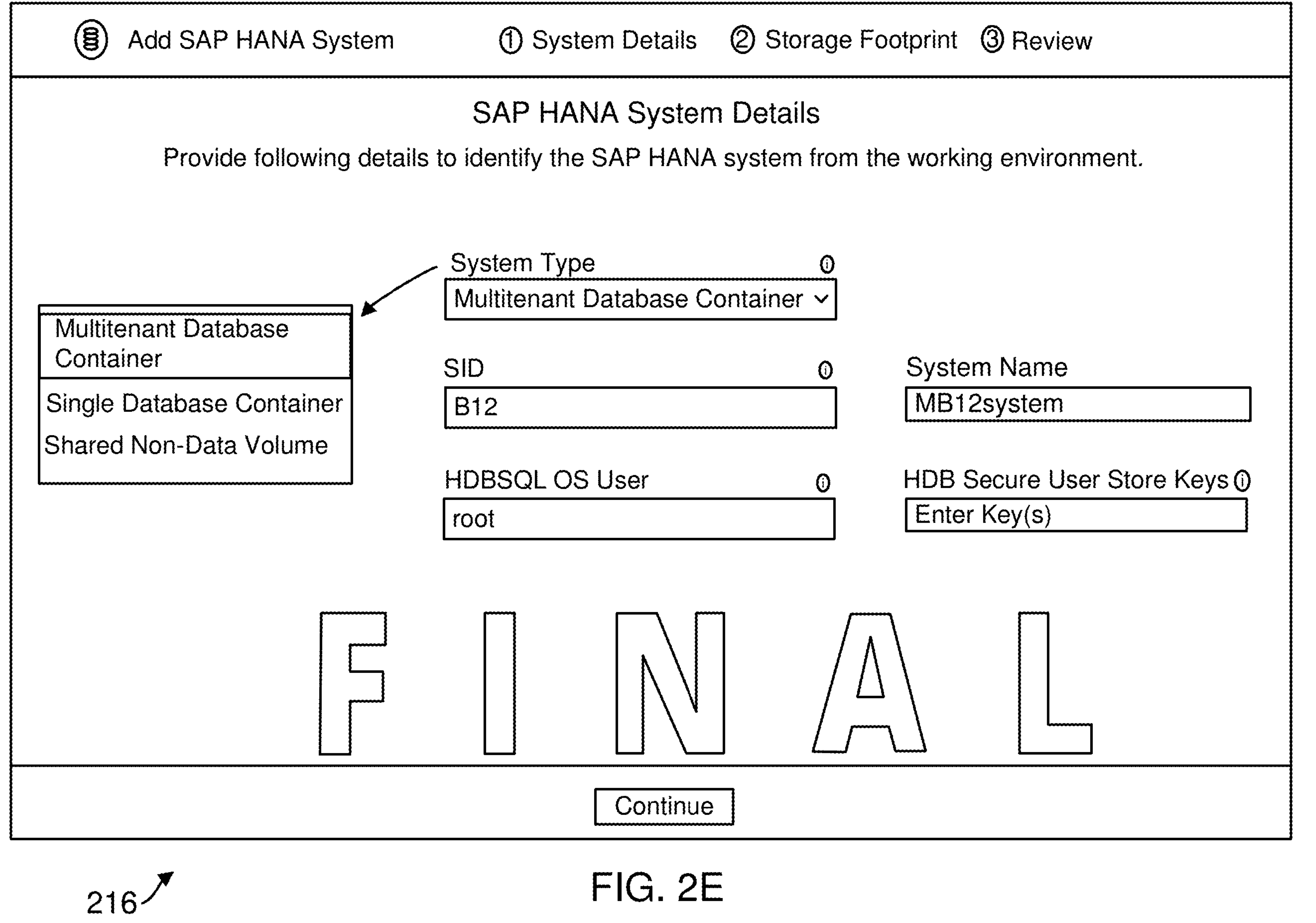
FIG. 2E shows an example of adding a system by the SSUI to protect and manage data, according to one aspect of the present disclosure.
Figure 2F:
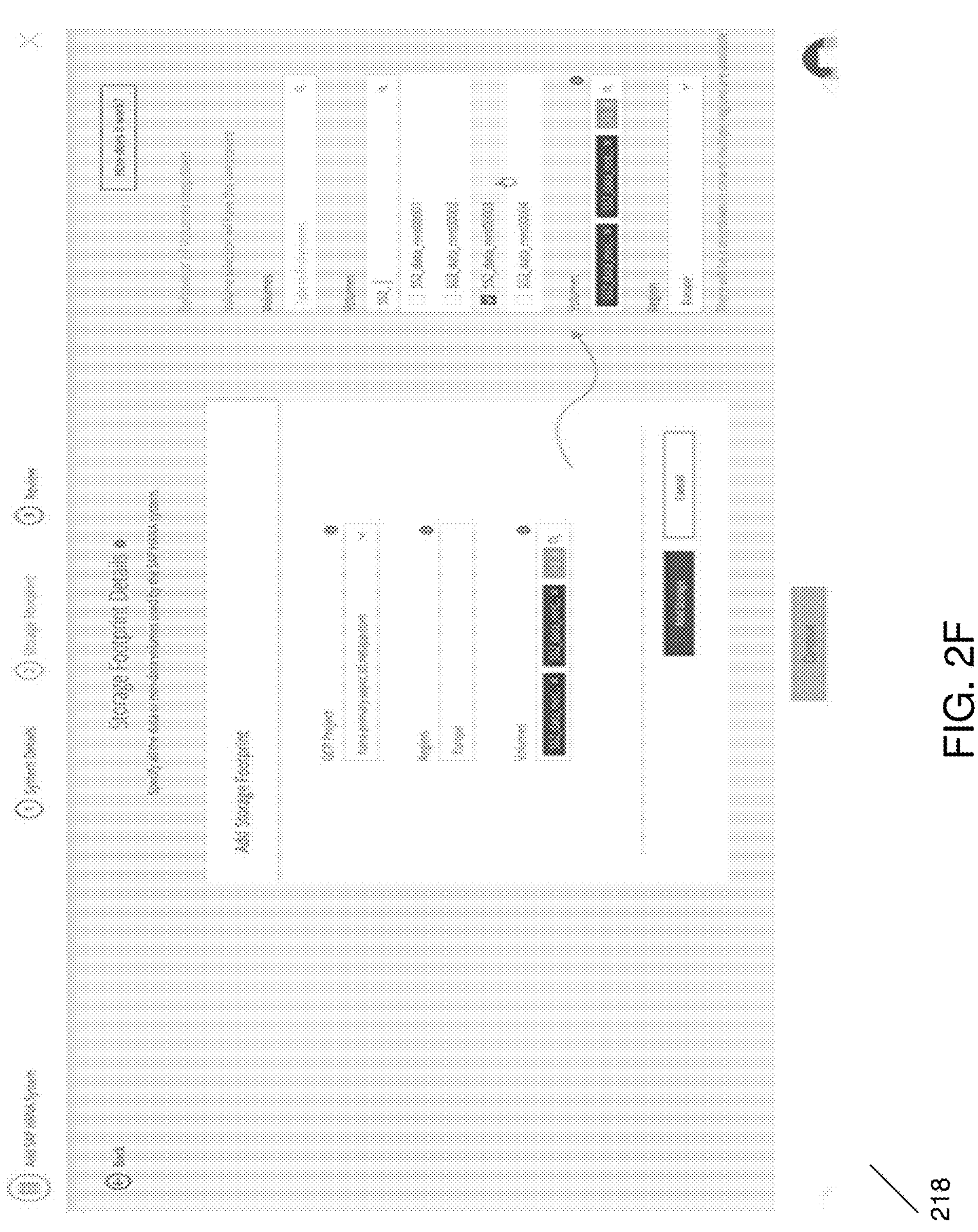
FIG. 2F shows an example of adding a storage volume by the SSUI, according to one aspect of the present disclosure.
Figure 2G:
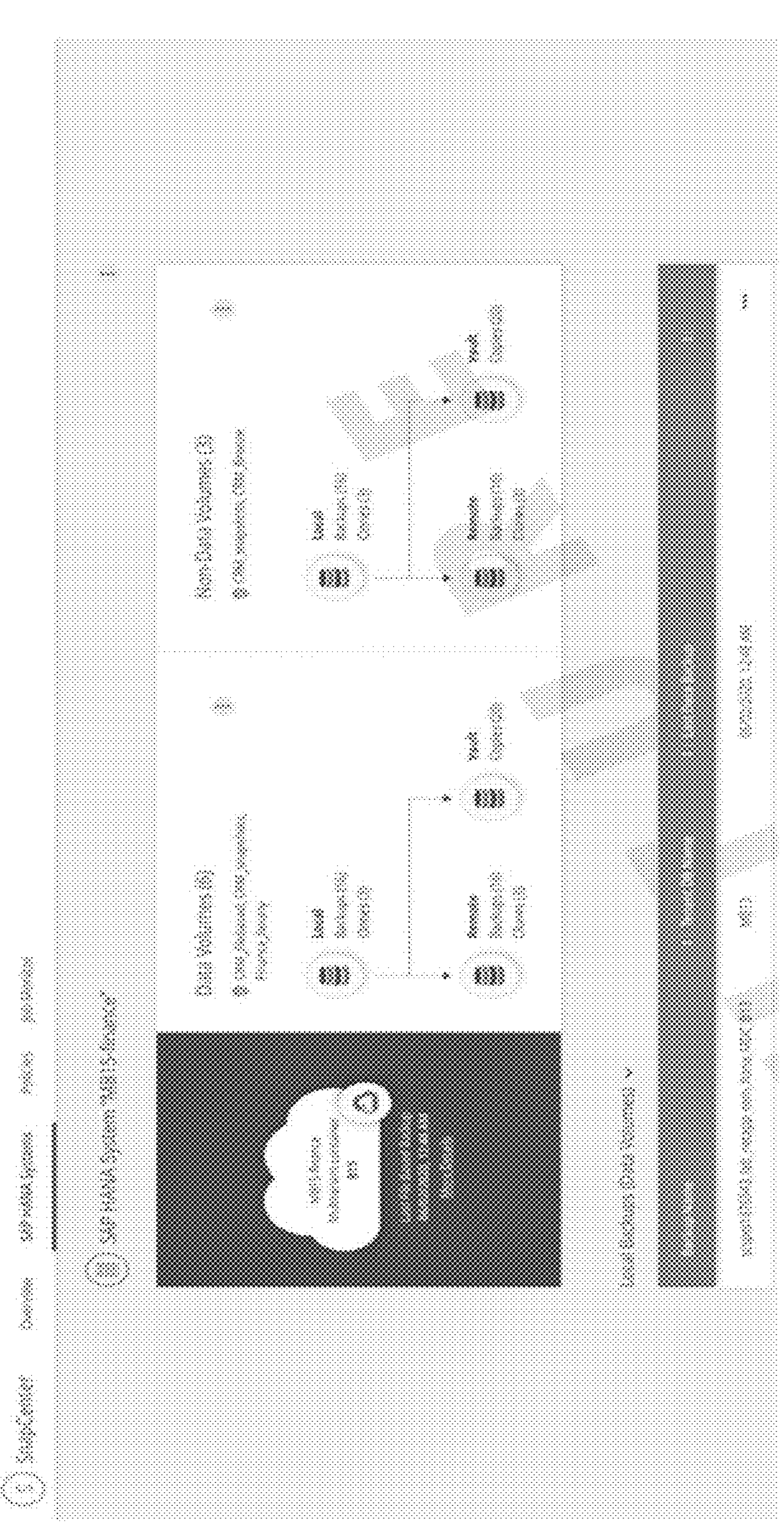
FIG. 2G shows an example of a topology view for a system presented by the SSUI 110, according to one aspect of the present disclosure.

FIG. 2D shows system level details in screen shot 214, when tab 206A is selected from FIG. 2C. The details in screen shot 214 are based on data structure 122E. The system level details identify each system within column 214A. The system type is indicated within column 214B, while the associated policy of each system is provided in column 214C. Screen shot 214 also indicates the protection status within column 214E and the last backup under column 214D. Option 214F enables a user to add a new system as shown in the screen shot 216 of FIG. 2E. The storage volumes for the new system are added/provisioned within screen shot 218 of FIG. 2F, shown as "add storage footprint."

FIG. 2G shows a topology view in screenshot 220 for an application instance (shown as an example, "SAP HANA System "MB14-finance," a database application instance using both data volumes and non-data volumes). The topology view shows both remote and local backups for the application instance, based on data structure 122G. The term local in this context refers to backups from the cloud layer 136, while the remote backup refers to a backup taken by the storage system 120 using the management system 132. This gives a summary of data volume backups and non-data volume backups. Screen shot 220 also shows a list of backups and when a last successful backup was taken.

Figure 2H:
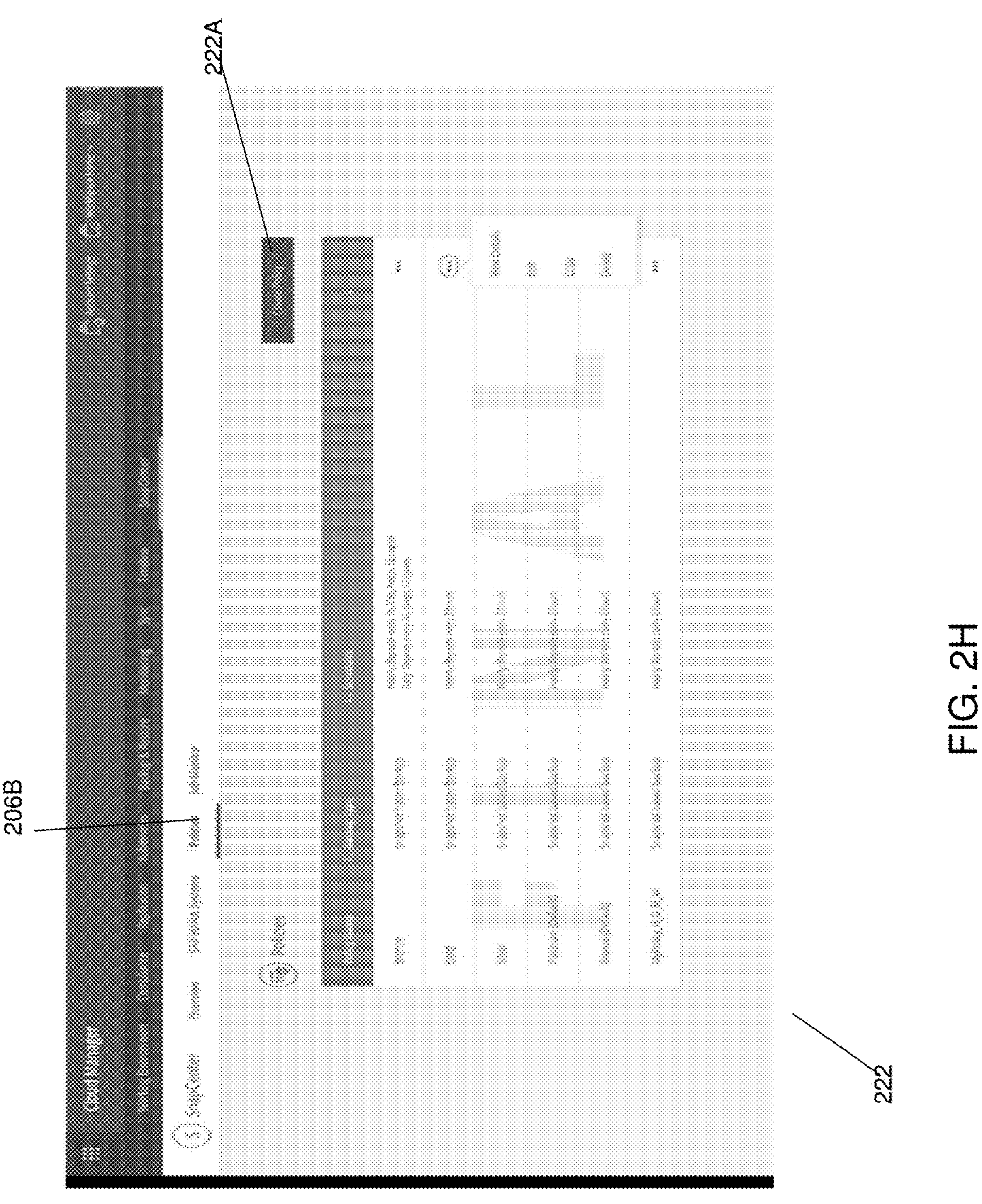
FIG. 2H shows an example of a policy view presented by the SSUI, according to one aspect of the present disclosure.
Figure 2I:
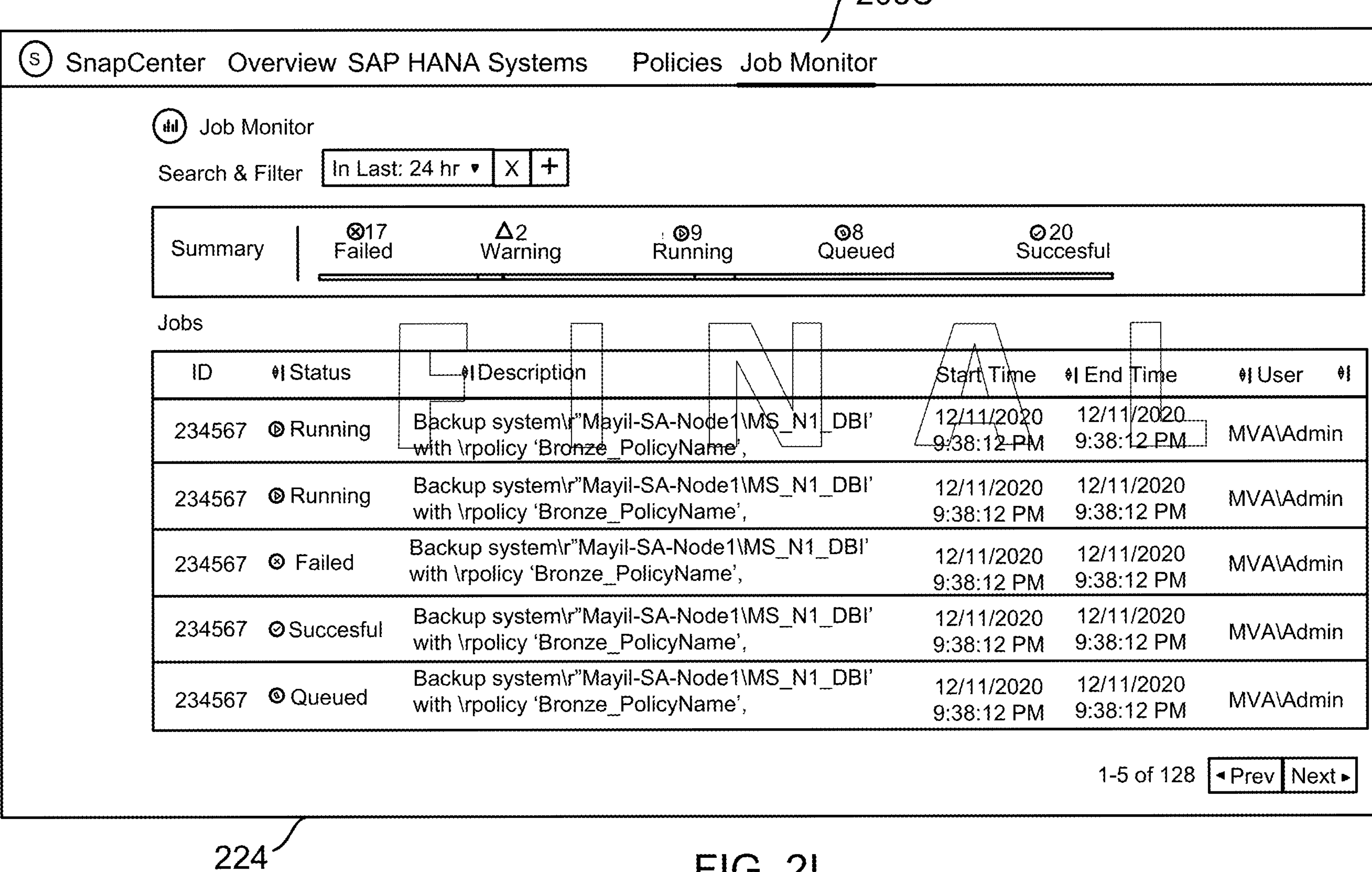
FIG. 2I shows an example of job status presented by the SSUI, according to one aspect of the present disclosure.

FIG. 2H shows a screen shot 222 providing a policy view from SSUI 110. The screen shot 222 provides a listing of policies with associated schedules and backup type. The policy details can be viewed by clicking on a specific policy name. A new policy can be added by selecting option 222A.

FIG. 2I shows a screen shot 224 presented by SSUI 110 after option 206C is selected. The screen shot 224 identifies each job, the status of each job, with a start time and end time. The user associated with each job is also identified. The information in screen shot 224 is based on data structure 122F. Details regarding each job are presented by selecting a specific job.

In one aspect, innovative computing technology for executing a method is provided. The method includes initializing, a SSUI (e.g., 110) within a cloud manager user interface ("CMUI" e.g., 122), the SSUI configured to operate as an integrated component for provisioning storage for an application and enable a storage service operation selected from a backup operation, a restore operation and a cloning operation associated with a storage object stored at a cloud volume (e.g. 138) presented by a cloud layer (e.g. 136), the CMUI presented by a cloud provider (e.g. 161); transmitting, by the SSUI, an authorization token to a SaaS layer (e.g., 142, FIG. 1A) for authenticating deployment of the SSUI (e.g., B111, FIG. 1C); upon validating the authorization token, initializing a SSUI agent (e.g. 130B, FIG. 1A) to interface with a deployed storage micro-service layer (e.g., 106, FIG. 1A) offered by the cloud layer to execute the storage service operation (e.g., B113, FIG. 1C); transmitting, by the SSUI, an application programming interface (API) request for the SSUI agent for executing the storage service operation (B115, FIG. 1C); and executing, by the deployed storage micro-service layer, the storage service operation (B123, FIG. 1C). The SSUI agent is deployed within a connector module (e.g., 112, FIG. 1A) in the cloud layer for interfacing with the storage micro-service layer.

The method further includes receiving, by the SaaS layer, the API request (e.g., B115, FIG. 1C); and forwarding, by the SaaS layer, the API request to the SSUI agent (B117, FIG. 1C). The method further includes generating, by the SSUI, a topology view (e.g., B159, FIG. 1E) for the application indicating whether a local backup, a remote backup or both the local backup and the remote backup have been taken for the storage object.

The method also includes transmitting, by the SSUI agent, the API request received from the SaaS layer to the storage micro-service layer; utilizing, by the storage micro-service layer, a first plugin (B143, FIG. 1D) for the application to execute the storage service operation; and utilizing, by the storage micro-service layer, a second plugin (B143, FIG. 1D) for the application to execute the storage service operation.

The method further includes storing, by the connector module, application credentials (e.g., 178, FIG. 1A) for authenticating the application to use the storage micro-service layer for executing the storage operation.

Figure 3A:
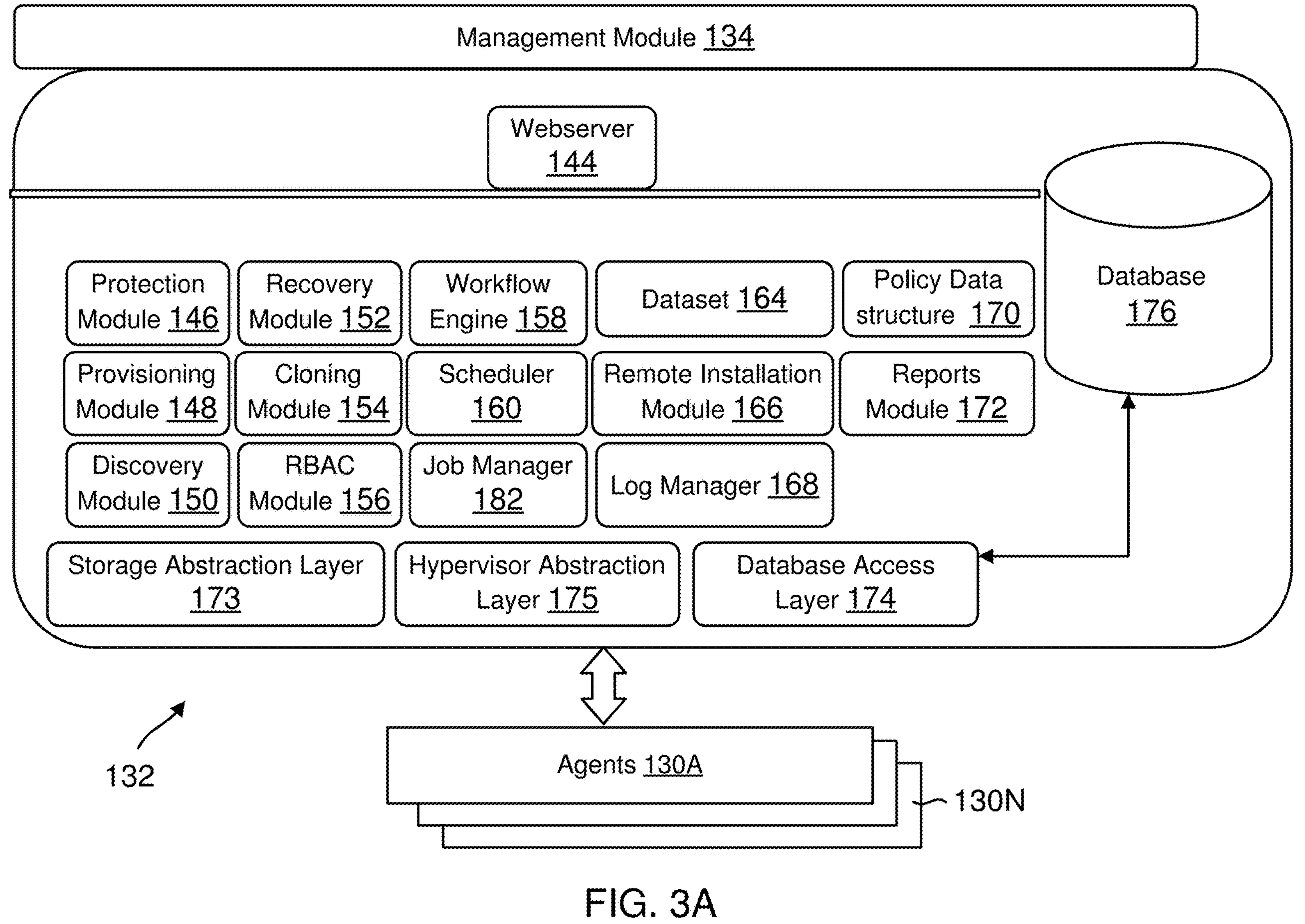
FIG. 3A shows a block diagram of an on-premise management module, according to one aspect of the present disclosure.
Figure 3B:
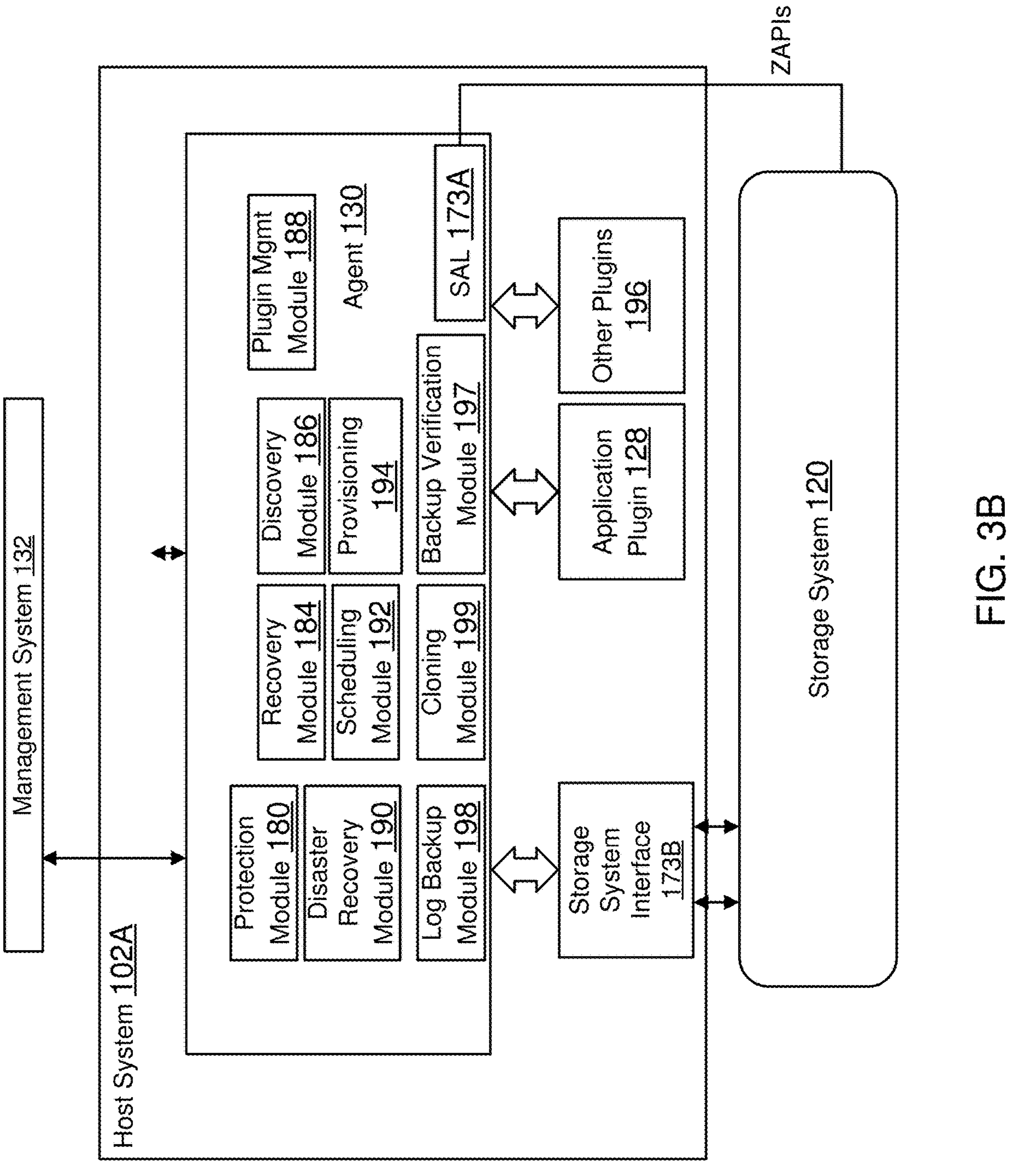
FIG. 3B shows a block diagram of an agent used by a computing system (or host system) for interfacing with the management module and other components of FIG. 1A, according to one aspect of the present disclosure.

Management System 132: FIG. 3A shows a block-level diagram of the on-premise, management system 132 with the management module 134, according to one aspect of the present disclosure. The management module 134 may be executed by a stand-alone system or may interface with another management console/application to manage and interface with multiple instances of agents' 130A-130N. The management module 134 may also be implemented as an application within a VM environment of host 102A. The management module 132 is configured to interface with host systems 102A-102N and the storage system 120. The management module 134 also interfaces with the SSUI 110, as shown in FIG. 1B and described above, which enables a user to manage cloud-based storage and on-premise storage from a single application. It is noteworthy that the management module 134 and agent 130A-130N include various components that are similar to the components of the storage micro-service 106 described above. The functionality of the common components can be implemented in the cloud layer 136, as described above.

The management module 134 includes a web server 144 for enabling Internet based communication. As an example, web server 144 may be implemented as an Internet Information Services (IIS) for a Windows® Server web server (without derogation of any third-party trademark rights). The web server 144 interfaces with a workflow engine 158 (similar to the workflow engine 158 of the storage micro-service 106 described above) that coordinates and manages various tasks that are performed by the different components of the management module 134.

In one aspect, the workflow engine 158 coordinates dataset 164 creation, policy allocation and manage a database 176. The workflow engine 158 communicates with various agents 130A-130N (similar to SSUI agent 130B, described above) for host system related storage service operations.

In one aspect, the management module 134 also includes a protection module 146, a provisioning module 148, a discovery module 150, a recovery module 152, a cloning module 154, a role based access control (RBAC) module 156, a storage abstraction layer (may also be referred to as "SAL") 173, a hypervisor abstraction layer (may also be referred to as "HAL") 175, a scheduler 160, a job manager 182, a remote installation module 166, a log manager 168, a policy data structure 170, a reports module 172 and a database access layer 174 that can access the database (or any other data structure type) 176. The database 176 stores various data structures (or objects) in a format that allows the management module 134 to handle storage services for different applications/host systems.

The log manager 168 collects logs from agents 130 and the various plugins. The logs can then be presented to a user via a GUI (e.g. SSUI 110). The logs may be for event management and audit for various management system 132 operations. The logs may be collected for a job based on a job identifier.

The protection module 146 is used to enforce a policy for a storage services related job (e.g. backup and/or restore operations). The protection module 146 maintains a protection policy for a plurality of objects (or protection group) that are to be backed up and provides protection service for backing up the protection group objects. Based on an application object, a call is made to an appropriate plugin for providing the appropriate protection service.

In one aspect, the protection module 146 maintains protection group objects for abstract representation of a container of application objects where protection of application objects is defined by policy objects. The protection group objects map to dataset objects 164 (shown as dataset 164).

The provisioning module 148 allows a user to configure and provision a LUN/volume (used interchangeably) that may be used to store information (e.g., for a multitenant database system) from SSUI 110. The provisioning module 148 allows a user to set a LUN size and appropriate permissions for using the LUN, for example, reading and writing data, permission for changing a LUN size, deleting a LUN and other operations. Storage volume information is saved in a standard format at database 176 and includes, name of the storage volume, storage connection identifier (described below), size, a junction path, date volume was created and an aggregate.

The discovery module 150 interfaces with the agents 130A-130N executed at different host systems to obtain information regarding the host systems, storage resources used by various applications and information regarding data containers that are protected (i.e. backed up) and unprotected. The discovery module 150 also facilitates discovery and management of application specific objects, for example, VMs, databases, hypervisor and others. Based on the application type, an appropriate plugin is used to discover different objects.

In one aspect, the discovery module 150 initiates a discovery operation with the agents 130. An API presented by the management module 134 determines if an agent 130 is installed at a host system. If the agent 130 is installed, then the agent 130 discovers the various plugins at that host system. If the agent 130 is not installed, then it is installed by the remote installation module 166 and the appropriate plugins are installed as well.

The cloning module 154 is used to clone storage volumes that are maintained by the storage system 120. The cloning module 154 is also used for managing the life cycle of a clone. The term clone as used herein is a duplicate copy of a snapshot. The term clone life cycle management means generating a clone and deleting a clone by the user when it is no longer required.

The RBAC module 156 stores information regarding different clients/entities that are given access to storage. For example, a business unit may be allowed to read certain storage volumes and may not be allowed to backup, clone, replicate or delete any storage volume. The RBAC module 156 manages the various roles and access type for different applications that may be executed in different host systems/computing environments including a multitenant database environment described above.

In one aspect, RBAC module 156 includes an authentication and authorization module. User authentication may happen at multiple end points, for example, via a GUI login, a login API for clients or plugins and others. The authentication module authenticates users against different domain/subsystem requirements, for example, an Active Directory, a local Windows machine host system, open LDAP (lightweight directory protocol) and others. Once a user is authenticated, an encrypted token is generated based on user information. In another aspect, a hash token is generated based on the generated token. The hashed token is saved at database 176. The hashed token may be based on MD5 (Message Digest Algorithm, 5, SHA (secure hash algorithm)-1 or any other technique.

When the authenticated user logs back in, the user passes the token and the management system 132 decrypts the token, validates the token and regenerates the hash value. The hash value is compared with the stored hash value in database 176.

In one aspect, the authorization module of the RBAC module 156 creates custom roles (for example, an administrator, backup administrator, backup operator, backup viewer, restore administrator and others), modifies existing roles, assigns and unassigns permissions to and from a role (for example, a dataset, policy, host, storage connection, a dashboard, a report, discovery, remote installation and others), assigns and unassigns users to roles and assigns and unassigns resources (for example, hosts, datasets, policy and others).

In one aspect, roles determine a set of capabilities that are available to members of the role. For example, a backup administrator may be allowed to add a host system, add a tenant database, install plugins, create a dataset, create a backup dataset, delete a dataset, create policies, delete backups, restore applications and others. A backup operator may be allowed to start and stop existing dataset jobs, monitor backups, view backup reports and perform application level restore operations. A backup viewer may be given read only access to backups, view existing backups and review job session details. A restore administrator may be allowed to perform restore operations using existing backups. The adaptive aspects described herein are not limited to these roles.

All the tasks conducted by the management module 134 are organized and monitored by the job manager 182. The job schedules are managed by the scheduler 160. When a new job arrives, the job manager 182 stores the job information in a database (for example, 176) with other existing jobs. The job manager 182 creates sub-tasks for executing the appropriate workflows. The sub-tasks depend on the nature of the job (for example, backup, restore, cloning or others). The job manager 182 updates the status of each task to provide real-time updates via the SSUI 110.

In one aspect, the policy data structure 170 is used to store policies for different stored objects. The policy information is configurable and may be changed by a user. In one aspect, the policy data structure 170 format is the same across different applications. This enables the management module 134 to manage storage services across different platforms with different requirements and operating parameters. The policy data structure 170 includes various policy objects to store various policies each with a set of attributes that may be applied to any dataset. The policy object stores a policy identifier, a policy name, description, a backup schedule policy, a retention count as to how long a backup is to be retained, a replication policy to replicate a backup from one location to another, types of backups, application consistent backups, and verification policies to verify a backup and others. It is noteworthy that a policy object may be shared across multiple datasets for multiple applications/plugins.

The reports module 172 is used to provide reports to users. The reports may be for different applications and in different formats.

In one aspect, the management module 134 maintains the dataset 164 for different applications and application objects. Each dataset is uniquely identified and named. The dataset format for managing replication for different applications is the same, regardless of how the applications handle information. A dataset may be associated with a policy data structure that defines how an object is to be protected. The dataset format used by the various aspects of the present disclosure allows a user to add or remove stored objects that need to be protected.

In one aspect, dataset 164 represents a container of application objects where protection attributes may be defined in terms of backup policy, replication profiles and retention policies. Dataset 164 is a basic unit that is used to manage backup, restore and cloning operations described above. A user can add any permissible resource to the dataset from multiple host systems/applications.

The database access layer 174 saves information in the database 176. The database 176 may be used to store information that is discovered by the discovery module 150, policy information, host information, datasets and other information.

In one aspect, the database 176 may store various data structures for managing the storage services and providing status via SSUI 110. As an example, the database schema for the database 176 is application format independent and may include various data structures to identify different host systems to specific login information, a backup metadata structure for storing information regarding backups, a data structure to map backups to stored objects including VMs, databases and others, a data structure for storing information on backup types, i.e. application consistent, full backup, copy backup, log backup for identifying volumes that are involved in each backup, a data structure to track various jobs that are managed by the job manager 182, discovery objects for storing information that is discovered by the discovery module 150, policy data structure 170, storage footprint and storage resource information, a data structure for storing information regarding various plugins, roles, role attributes, storage connections and user information, including credentials.

In one aspect, SAL 173 stores information regarding the various storage resources that are used and available for different hosts. SAL 173 maintains a "storage footprint" or storage layout for different storage resources (for example, storage systems including storage devices) used by different applications.

In one aspect, HAL 175 is used to communicate with another plugin that is used to collect information related to storage used by different virtual machines.

Agent 130: FIG. 1I shows an example of the agent 130 that interfaces with the management system 132, according to one aspect of the present disclosure. The various components of agent 132 are similar to the components of the storage micro-service 106 that are described above. For example, the agent 130 includes a protection module 180 to manage and coordinate backup and cloning operations, a recovery module 184 to manage and coordinate restore operations to restore an object (e.g. a database), a discovery module 186 to manage and coordinate discovery operations, a plugin management module 188 to manage plugin installation at host 102, a disaster recovery module 190 to manage and coordinate disaster recovery operations, a scheduling module 192 to schedule tasks, for example, backup, cloning and restore operations, a provisioning module 194 for provisioning computing and storage resources, a log backup module 198 for managing logs for backup operations, a cloning module 199 for managing cloning operations, a backup verification module 197 for managing and coordinating backup verification operations and SAL 173A for communicating with the storage system 120.

SAL 173A maintains the storage footprint/layout for each application. In another aspect, the agent 130 interfaces with storage system 120 via the storage system interface 173B. An example of storage system interface is SnapDrive provided by NetApp Inc. (without derogation of any trademark rights of NetApp Inc.). In one aspect, storage system interface 173B uses storage APIs including ZAPIs (Zephyr Application Programming Interface), REST or other API types to send and receive data from storage system 120.

The backup verification module 197 verifies a backup or replication operation. Since different applications may have different requirements, the backup verification module 197 facilitates the verification for different applications.

The cloning module 199 assists in cloning a snapshot, and a log backup module 198 assists in backing up logs.

Figure 3C:
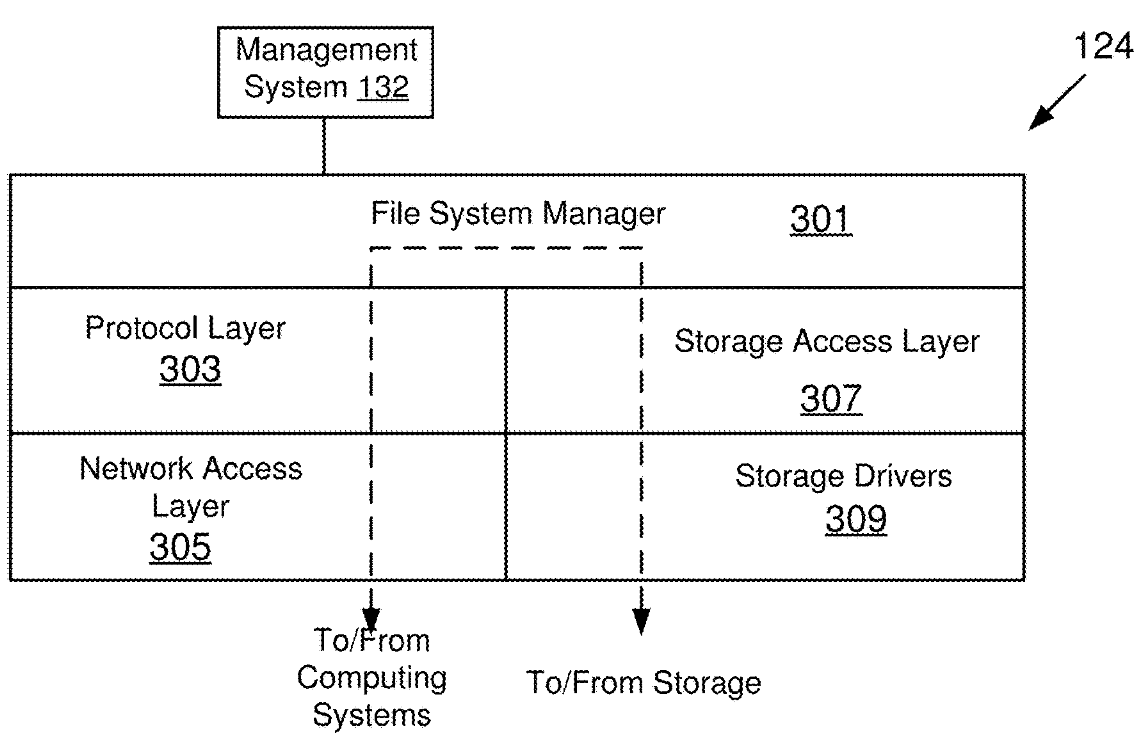
FIG. 3C shows an example of a storage operating system, used according to one aspect of the present disclosure.

Storage Operating System: FIG. 3C illustrates a generic example of storage operating system 124 executed by storage system 120 (or the cloud storage OS 140 in the cloud layer 136) and interfacing with the management system 132 that communicates with the SSUI 110, according to one aspect of the present disclosure.

As an example, operating system 230 may include several modules, or "layers". These layers include a file system manager 301 that keeps track of a directory structure (hierarchy) of the data stored in storage devices and manages read/write operations, i.e. executes read/write operations on storage devices in response to server system 102 requests.

Operating system 230 may also include a protocol layer 303 and an associated network access layer 305 to communicate over a network with other systems, such as host system 102A-102N and the cloud layer 136. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 102A-102N and mass storage devices 114 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level storage protocol, such as RAID (redundant array of inexpensive disks), while the storage driver layer 309 may implement a lower-level storage device access protocol, such as FC, SCSI or any other protocol.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 120.

As used herein, the term "storage operating system" generally refers to the computer-executable code operable on a computer to perform a storage function that manages data access and may implement data access semantics of a general-purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure may be adapted to a variety of storage system architectures including, but not limited to, a network-attached storage environment, a storage area network and a disk assembly directly attached to a client or host computer. The term "storage system" should therefore be taken broadly to include such arrangements in addition to any subsystems configured to perform a storage function and associated with other equipment or systems.

Figure 4:
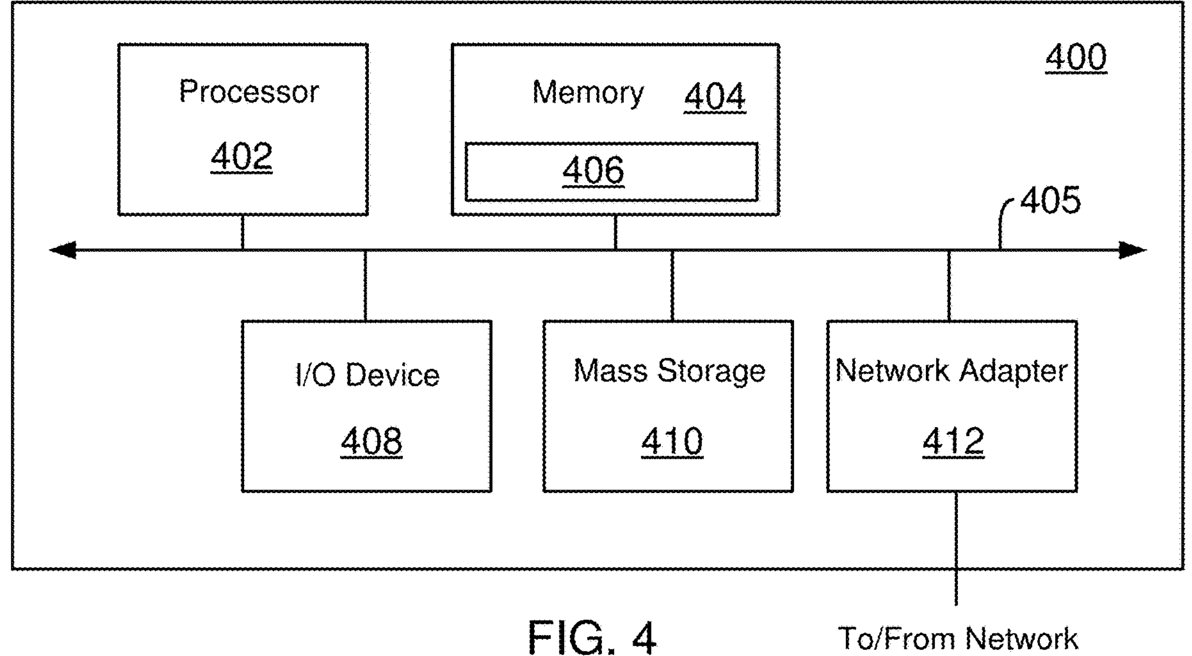
FIG. 4 shows an example of a processing system, used according to one aspect of the present disclosure.

Processing System: FIG. 4 is a high-level block diagram showing an example of the architecture of a processing system, at a high level, in which executable instructions as described above may be implemented. The processing system 400 can represent modules of the storage system 120, host systems 102A-102N, computing nodes that execute the functionality of the SaaS layer 142 and the cloud layer 136, user 101, computing system executing the cloud manager 122, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random-access memory (RAM), read-only memory (ROM), flash memory, or the like, or a combination of such devices. Memory 404 includes the main memory of the processing system 400. Instructions 406 which implement techniques introduced above may reside in and may be executed (by processors 402) from memory 404. For example, instructions 406 may include code used for executing the process blocks of FIGS. 1C-1G, SSUI 110, the cloud manager 122, data structures 122A-122G, agents 130A-130N, management module 134 and the various plugins/applications.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, an FC adapter, or the like. The processing system 400 also includes one or more input/ output (I/O) devices 408 coupled to the bus system 405. The I/O devices 408 may include, for example, a display device, a keyboard, a mouse, etc.

Thus, a method and apparatus for executing storage service operations from a single GUI have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

deploying a storage service user interface ("SSUI"), the SSUI being configured to provision storage for an application to store a storage object using a cloud volume presented by a cloud layer;

initiating, by the SSUI, a storage service operation selected from a backup operation, a restore operation and a cloning operation associated with the storage object;

deploying, by the SSUI, a SSUI agent within a connector module in the cloud layer for interfacing with a storage micro-service layer offered by the cloud layer to execute the storage service operation, wherein the connector module stores credentials for authenticating the application to use the storage micro-service layer;

tracking, by the SSUI, a protection status of the storage object for the application; and generating, by the SSUI, an overview of the application, wherein the overview includes the protection status of the storage object for the application.

2. The method of claim 1, wherein the protection status of the storage object includes a status selected from a protected status, an unprotected status and a need attention status.

3. The method of claim 1, wherein deploying the SSUI includes validating, by a Software as a Service ("SaaS") layer, an authorization message transmitted by the SSUI for deploying the SSUI.

4. The method of claim 1, wherein the SSUI is executed within a cloud manager user interface ("CMUI").

5. The method of claim 3, further comprising:

transmitting, by the SSUI, an application programming interface (API) request for the SSUI agent for the storage service operation; and receiving, by the SaaS layer, the API request and forwarding the API request to the SSUI agent.

6. The method of claim 5, further comprising:

transmitting, by the SSUI agent, the API request received from the SaaS layer to the storage micro-service layer; and utilizing, by the storage micro-service layer, a plugin for the application to execute the storage service operation.

7. The method of claim 1, further comprising:

generating, by the SSUI, a topology view for the application indicating whether a local backup, a remote backup or both the local backup and the remote backup have been taken for the storage object.

8. A non-transitory computer-readable storage medium containing program instructions, wherein execution of the program instructions by one or more processors of a computer causes the one or more processors to perform steps comprising:

deploying a storage service user interface ("SSUI"), the SSUI being configured to provision storage for an application to store a storage object using a cloud volume presented by a cloud layer;

initiating, by the SSUI, a storage service operation selected from a backup operation, a restore operation and a cloning operation associated with the storage object;

deploying, by the SSUI, an SSUI agent within a connector module in the cloud layer for interfacing with a storage micro-service layer offered by the cloud layer to execute the storage service operation, wherein the connector module stores credentials for authenticating the application to use the storage micro-service layer;

tracking, by the SSUI, a protection status of the storage object for the application; and generating, by the SSUI, an overview of the application, wherein the overview includes the protection status of the storage object for the application.

9. The non-transitory computer-readable storage medium of claim 8, wherein the protection status of the storage object includes a status selected from a protected status, an unprotected status and a need attention status.

10. The non-transitory computer-readable storage medium of claim 8, wherein deploying the SSUI includes validating, by a Software as a Service ("SaaS") layer, an authorization message transmitted by the SSUI for deploying the SSUI.

11. The non-transitory computer-readable storage medium of claim 8, wherein the SSUI is executed within a cloud manager user interface ("CMUI").

12. The non-transitory computer-readable storage medium of claim 10, wherein the steps further comprise:

transmitting, by the SSUI, an application programming interface (API) request for the SSUI agent for the storage service operation; and receiving, by the SaaS layer, the API request and forwarding the API request to the SSUI agent.

13. The non-transitory computer-readable storage medium of claim 12, wherein the steps further comprise:

transmitting, by the SSUI agent, the API request received from the SaaS layer to the storage micro-service layer; and utilizing, by the storage micro-service layer, a plugin for the application to execute the storage service operation.

14. The non-transitory computer-readable storage medium of claim 8, wherein the steps further comprise:

generating, by the SSUI, a topology view for the application indicating whether a local backup, a remote backup or both the local backup and the remote backup have been taken for the storage object.

15. A system comprising:

a memory; and one or more processors coupled to the memory, the one or more processors configured to execute machine executable code to;

deploy a storage service user interface ("SSUI"), the SSUI being configured to provision storage for an application to store a storage object using a cloud volume presented by a cloud layer;

initiate, by the SSUI, a storage service operation selected from a backup operation, a restore operation and a cloning operation associated with the storage object;

deploy, by the SSUI, an SSUI agent within a connector module in the cloud layer for interfacing with a storage micro-service layer offered by the cloud layer to execute the storage service operation, wherein the connector module stores credentials for authenticating the application to use the storage micro-service layer;

track, by the SSUI, a protection status of the storage object for the application; and generate, by the SSUI, an overview of the application, wherein the overview includes the protection status of the storage object for the application.

16. The system of claim 15, wherein the protection status of the storage object includes a status selected from a protected status, an unprotected status and a need attention status.

17. The system of claim 15, wherein the machine executable code further causes the one or more processors to validate, by a Software as a Service ("SaaS") layer, an authorization message transmitted by the SSUI for deploying the SSUI.

* * * * *